Figure 1:
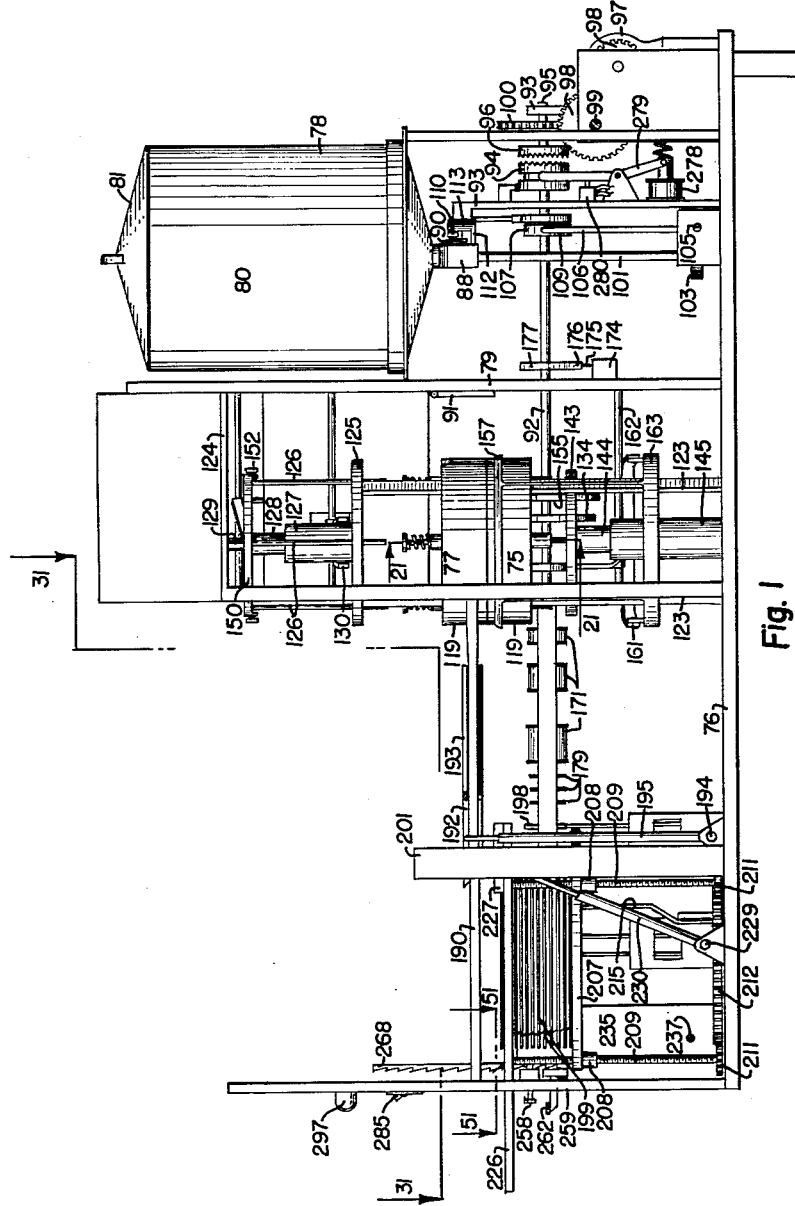

Aug. 16, 1955

J. L. WHITSEL 2,715,372

AUTOMATIC WAFFLE IRON

Filed Nov. 20, 1950

13 Sheets-Sheet 1

*INVENTOR.*
JAMES L. WHITSEL

BY

ATTORNEY

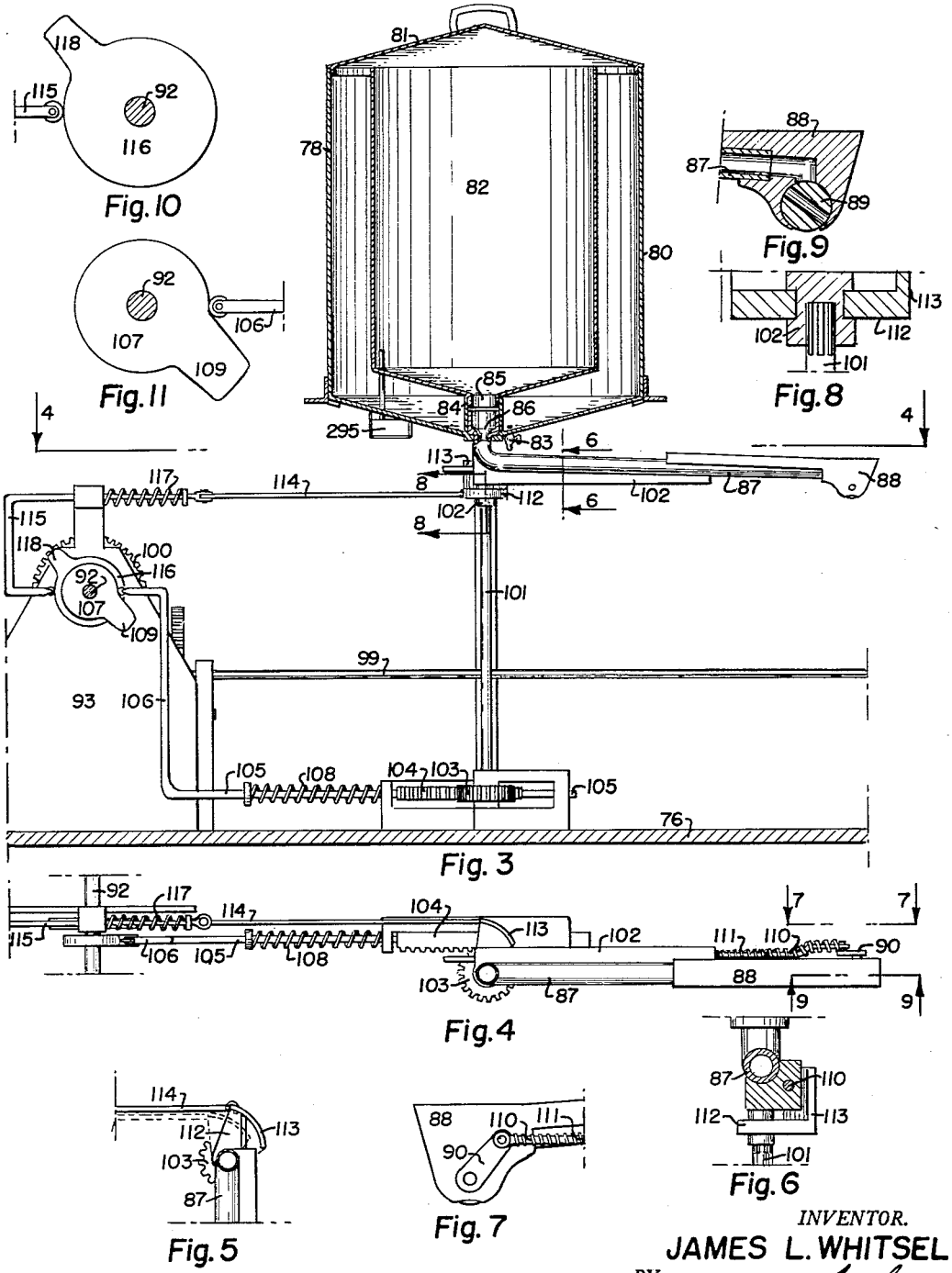

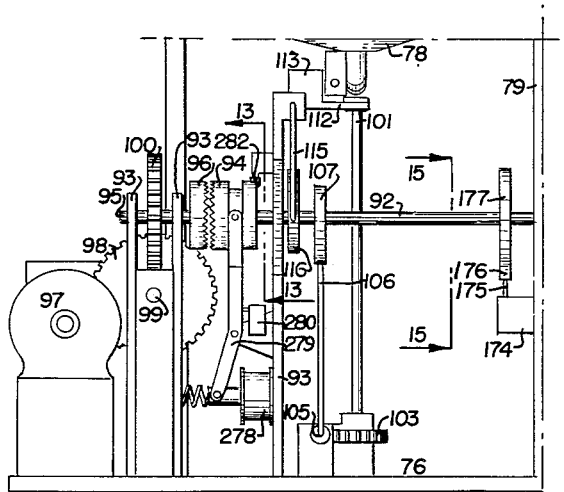

Aug. 16, 1955 J. L. WHITSEL 2,715,372
AUTOMATIC WAFFLE IRON
Filed Nov. 20, 1950 13 Sheets-Sheet 5

INVENTOR.
JAMES L. WHITSEL
BY
ATTORNEY

Aug. 16, 1955 J. L. WHITSEL 2,715,372
AUTOMATIC WAFFLE IRON
Filed Nov. 20, 1950 13 Sheets-Sheet 6
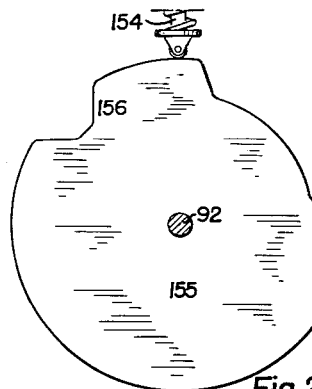
Fig. 22
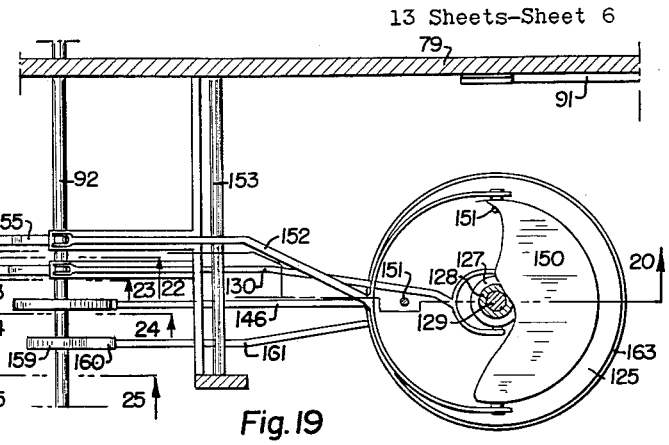
Fig. 19
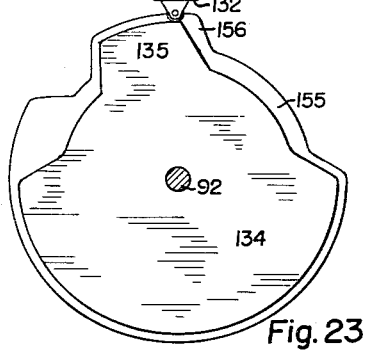
Fig. 23
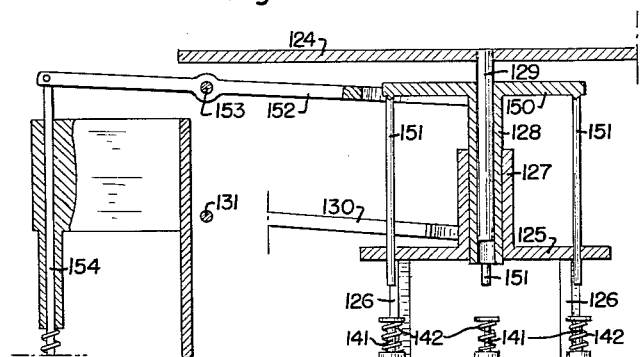
Fig. 20
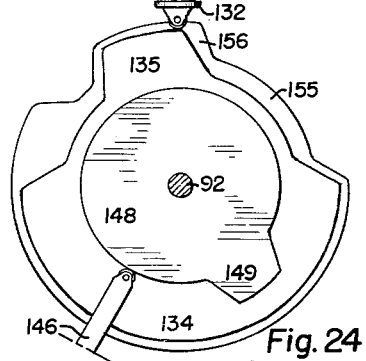
Fig. 24
Fig. 25
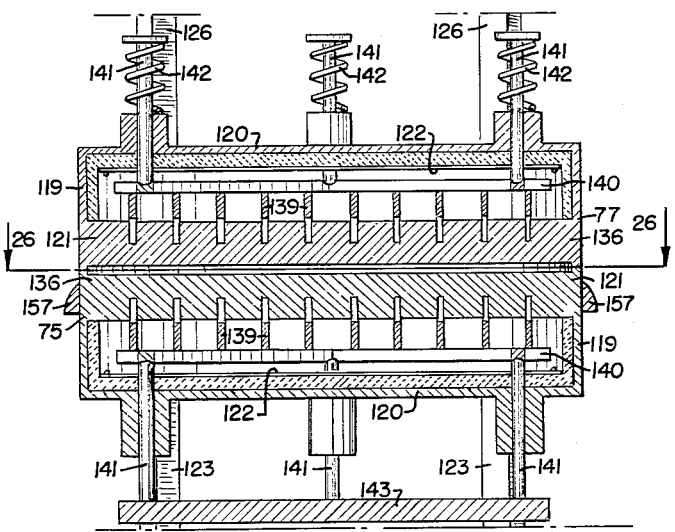
Fig. 21
INVENTOR.
JAMES L. WHITSEL
BY
ATTORNEY Aug. 16, 1955  J. L. WHITSEL  2,715,372
AUTOMATIC WAFFLE IRON
Filed Nov. 20, 1950  13 Sheets-Sheet 7

INVENTOR.
JAMES L. WHITSEL
BY
ATTORNEY

Aug. 16, 1955  J. L. WHITSEL  2,715,372
AUTOMATIC WAFFLE IRON
Filed Nov. 20, 1950  13 Sheets-Sheet 8

INVENTOR.
JAMES L. WHITSEL
BY
ATTORNEY

Aug. 16, 1955 J. L. WHITSEL 2,715,372
AUTOMATIC WAFFLE IRON
Filed Nov. 20, 1950 13 Sheets-Sheet 9
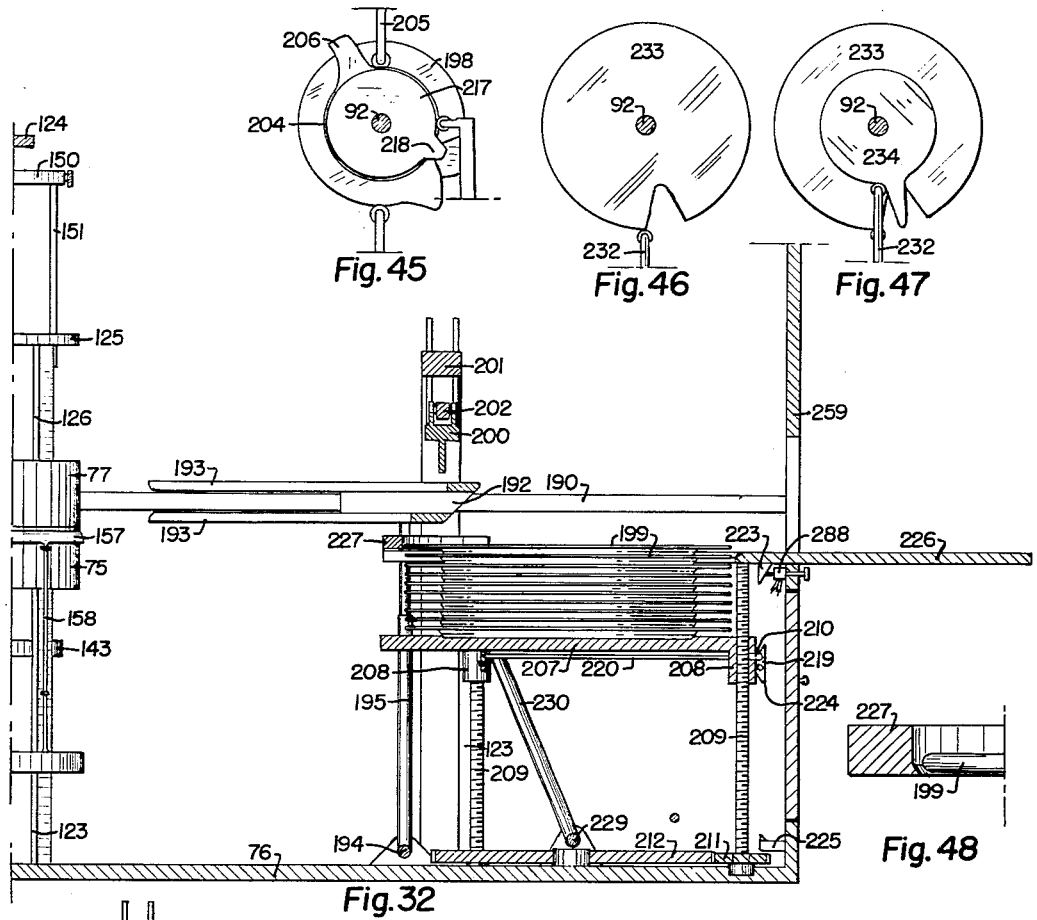
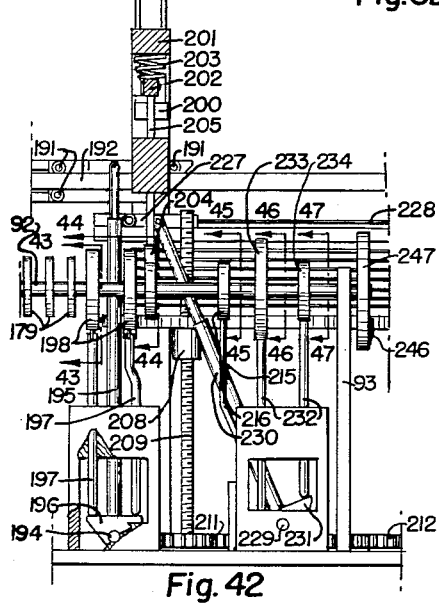
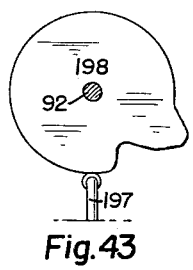
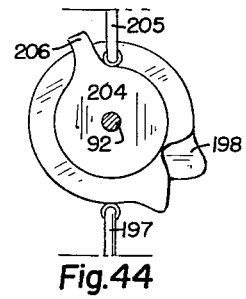
INVENTOR.
JAMES L. WHITSEL
BY
ATTORNEY Aug. 16, 1955  J. L. WHITSEL  2,715,372
AUTOMATIC WAFFLE IRON
Filed Nov. 20, 1950  13 Sheets-Sheet 10

INVENTOR.
JAMES L. WHITSEL
BY
ATTORNEY

Aug. 16, 1955  J. L. WHITSEL  2,715,372
AUTOMATIC WAFFLE IRON
Filed Nov. 20, 1950  13 Sheets-Sheet 12
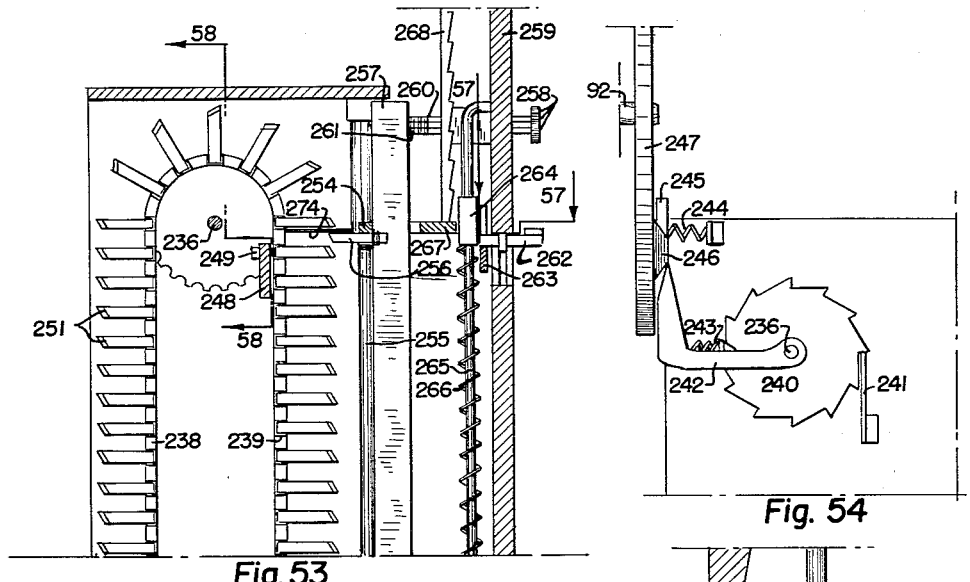
Fig. 53
Fig. 54
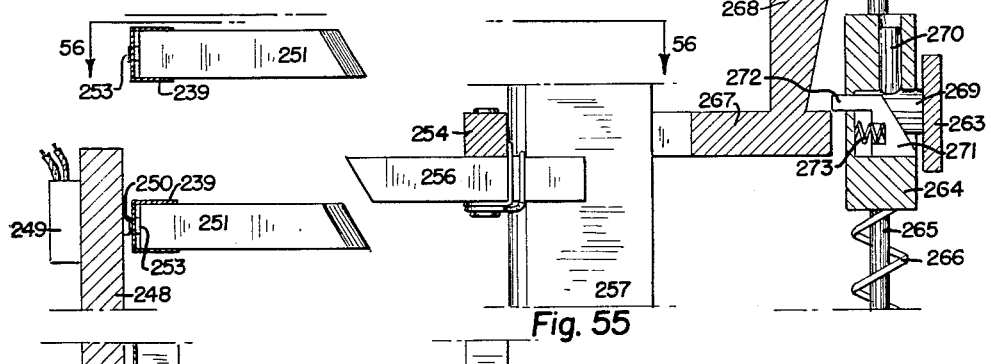
Fig. 55
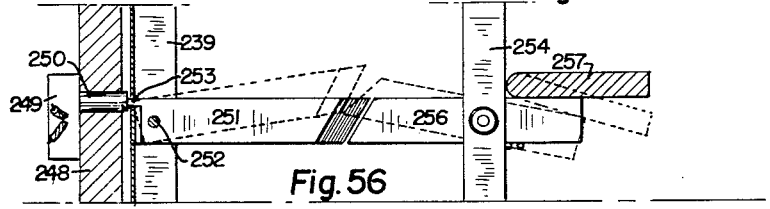
Fig. 56
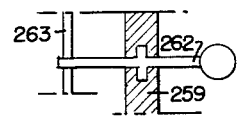
Fig. 57
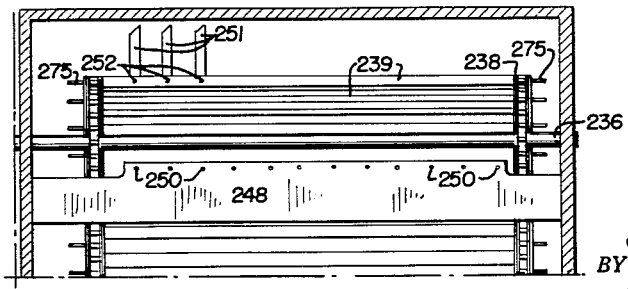
Fig. 58
INVENTOR.
JAMES L. WHITSEL
BY
ATTORNEY Inventor
JAMES L. WHITSEL

United States Patent Office 2,715,372
Patented Aug. 16, 1955

2,715,372

AUTOMATIC WAFFLE IRON

James L. Whitsel, near Williamsburg, Pa.

Application November 20, 1950, Serial No. 196,649

8 Claims. (Cl. 107—4)

This invention relates to means and apparatus for the production of waffles, and has as an object to provide an improved organization of elements automatically operable in reaction to the selective indexing therein of consumer orders to transform successive fractions of a prepared batter charge into cooked waffles delivered ready for serving.

A further object of the invention is to provide an improved interassociation and operative correlation of elements for the automatic production of cooked waffles in condition for serving.

A further object of the invention is to provide improved means automatically and operatively correlating appropriate elements for the cyclic and repetitive production of cooked waffles in reaction to the selective indexing of consumer orders therein.

A further object of the invention is to provide improved means for automatically supplying a measured charge of prepared batter from a supply thereof to a cooking iron in an organization for the automatic production of waffles.

A further object of the invention is to provide improved means for automatically regulating the cooking time and temperature of an iron in an organization for the automatic production of waffles.

A further object of the invention is to provide improved means for transferring cooked waffles from a cooking iron and to a service plate as a stage in their automatic production.

A further object of the invention is to provide improved means receptive of and reactive to multiple and successive indexing therein of consumer orders in automatically-controlling relation with a waffle-producing organization.

A further object of the invention is to provide apparatus for the automatic production of cooked waffles that is positive and efficient in operation with a minimum of human attention, susceptible of production from known and available materials, elements, and instrumentalities, and capable of responding to consumer order indices selectively registered therein at any stage of the operative cycle of the apparatus.

With the foregoing and other objects in view, my invention consists in the construction, arrangement, and operative combination of elements as hereinafter set forth, pointed out in my claims, and illustrated by the accompanying drawings, in which—

Figure 2:
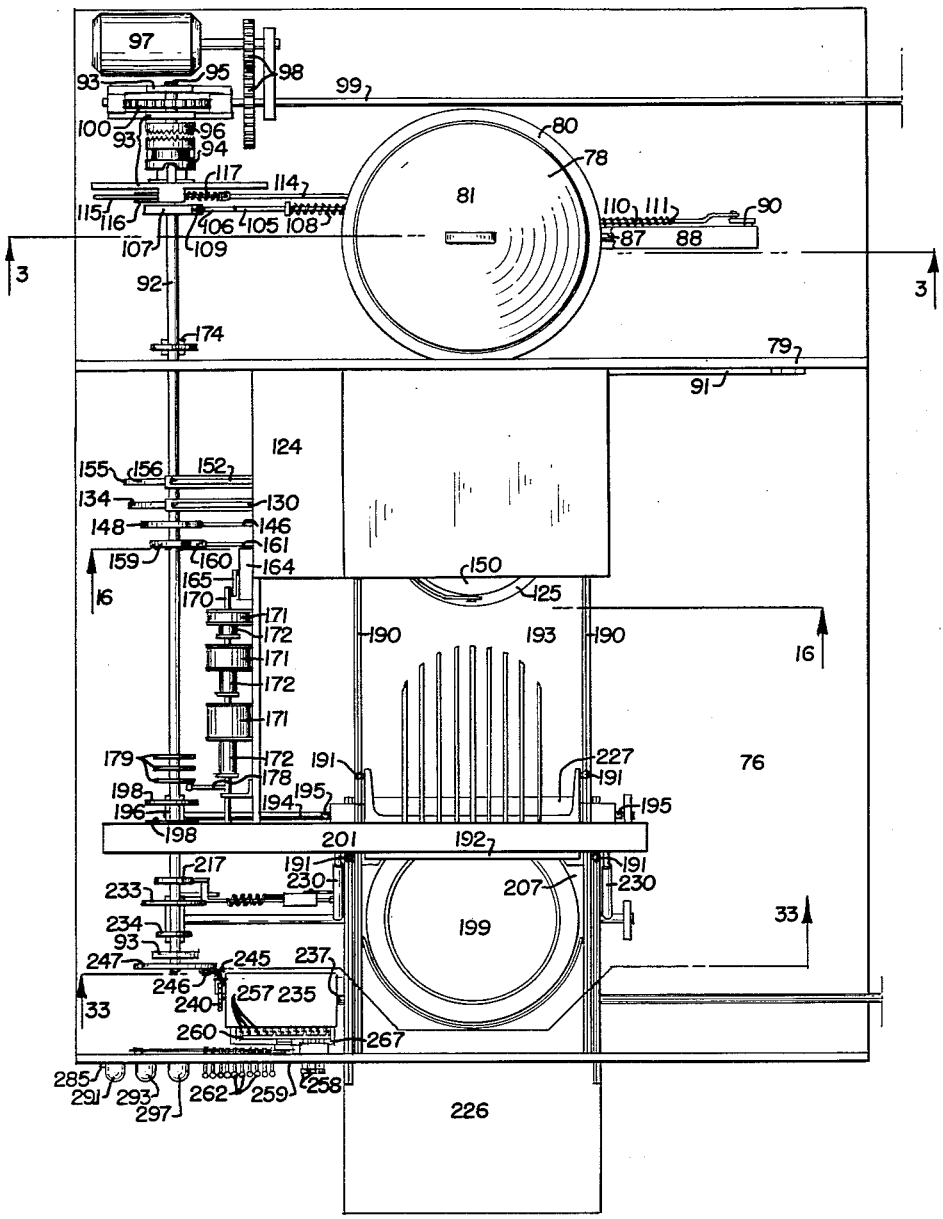
Figure 16:
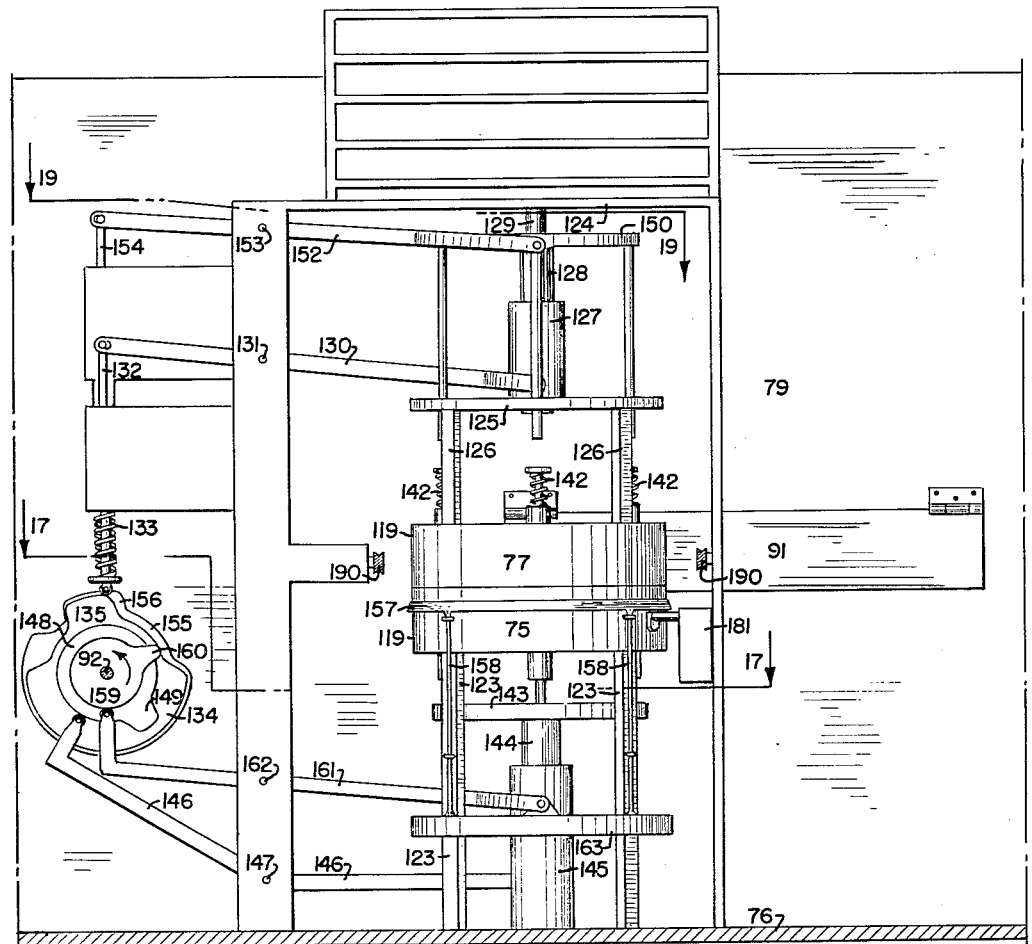
Figure 17:
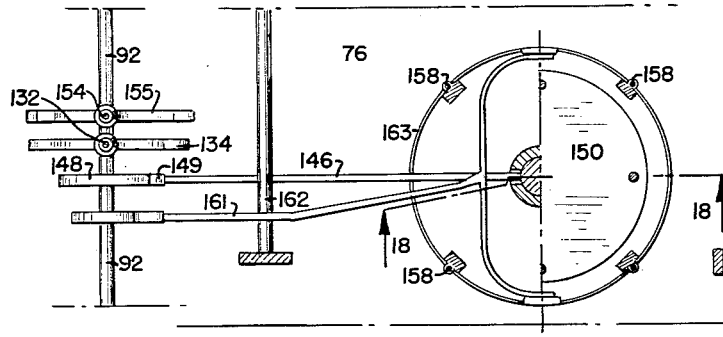
Figure 18:
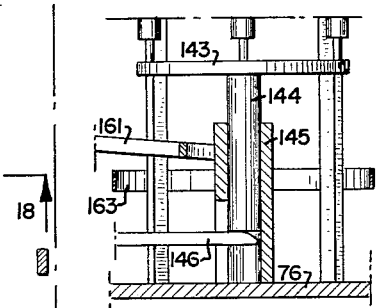
Figure 26:
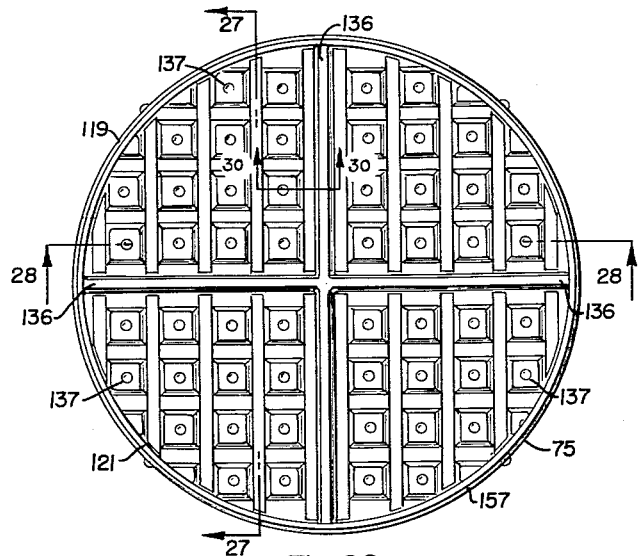
Figure 27:
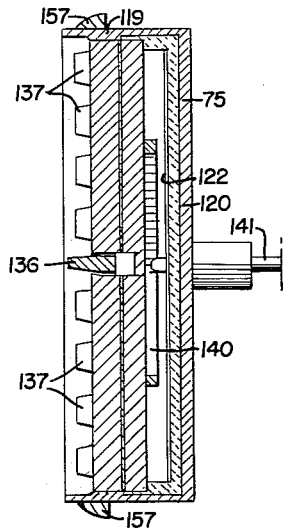
Figure 29:
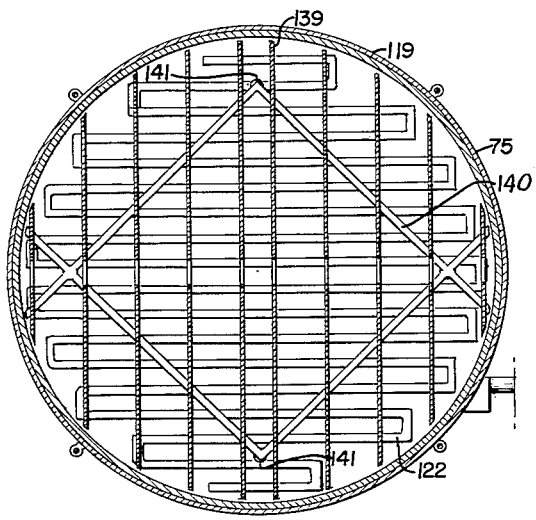
Figure 30:
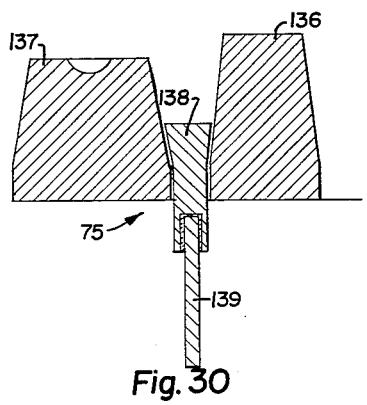
Figure 28:
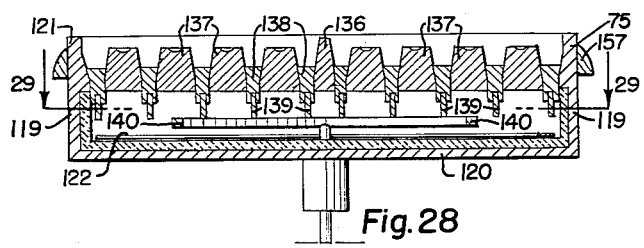
Figure 31:
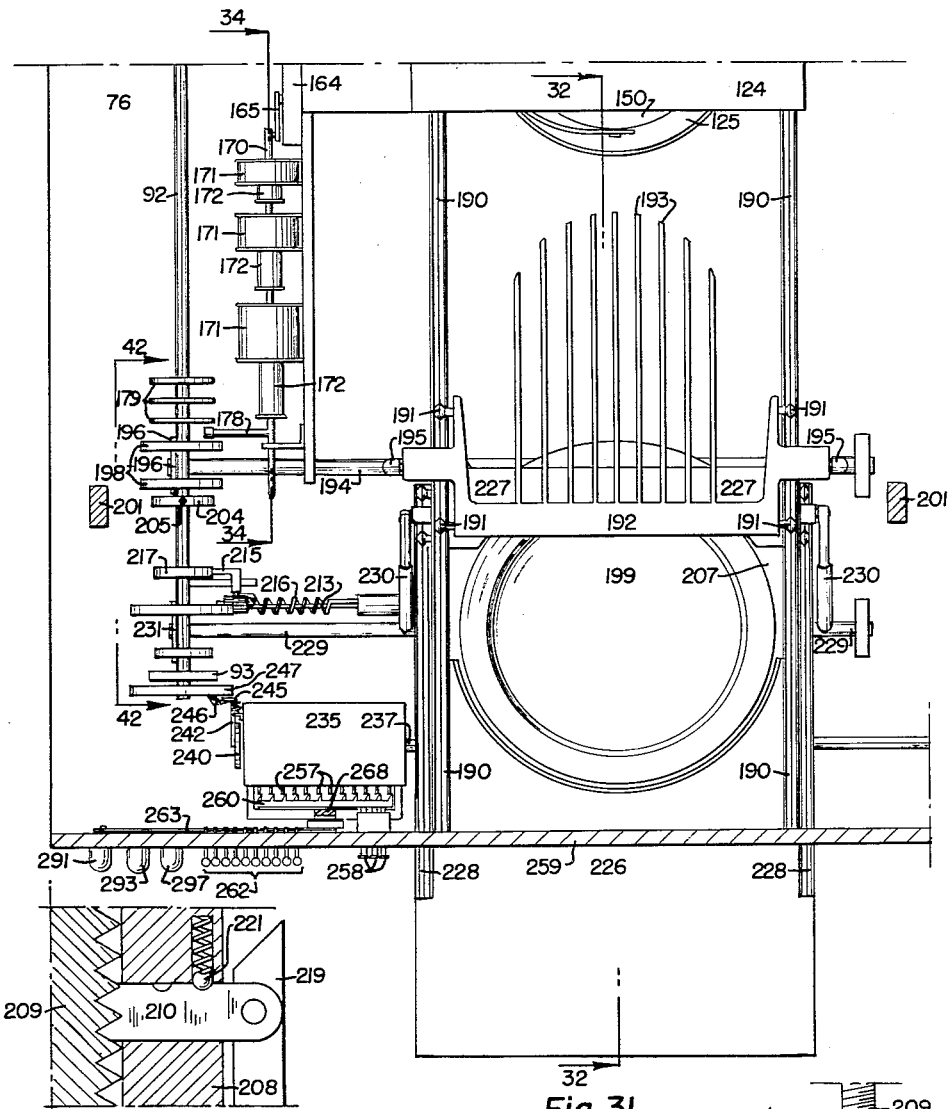
Figures 39, 40:
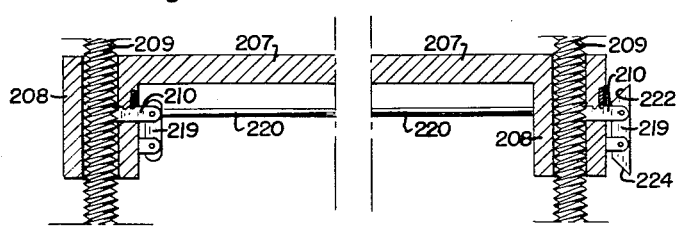
Figure 41:
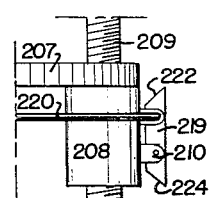
Figures 33, 49, 50:
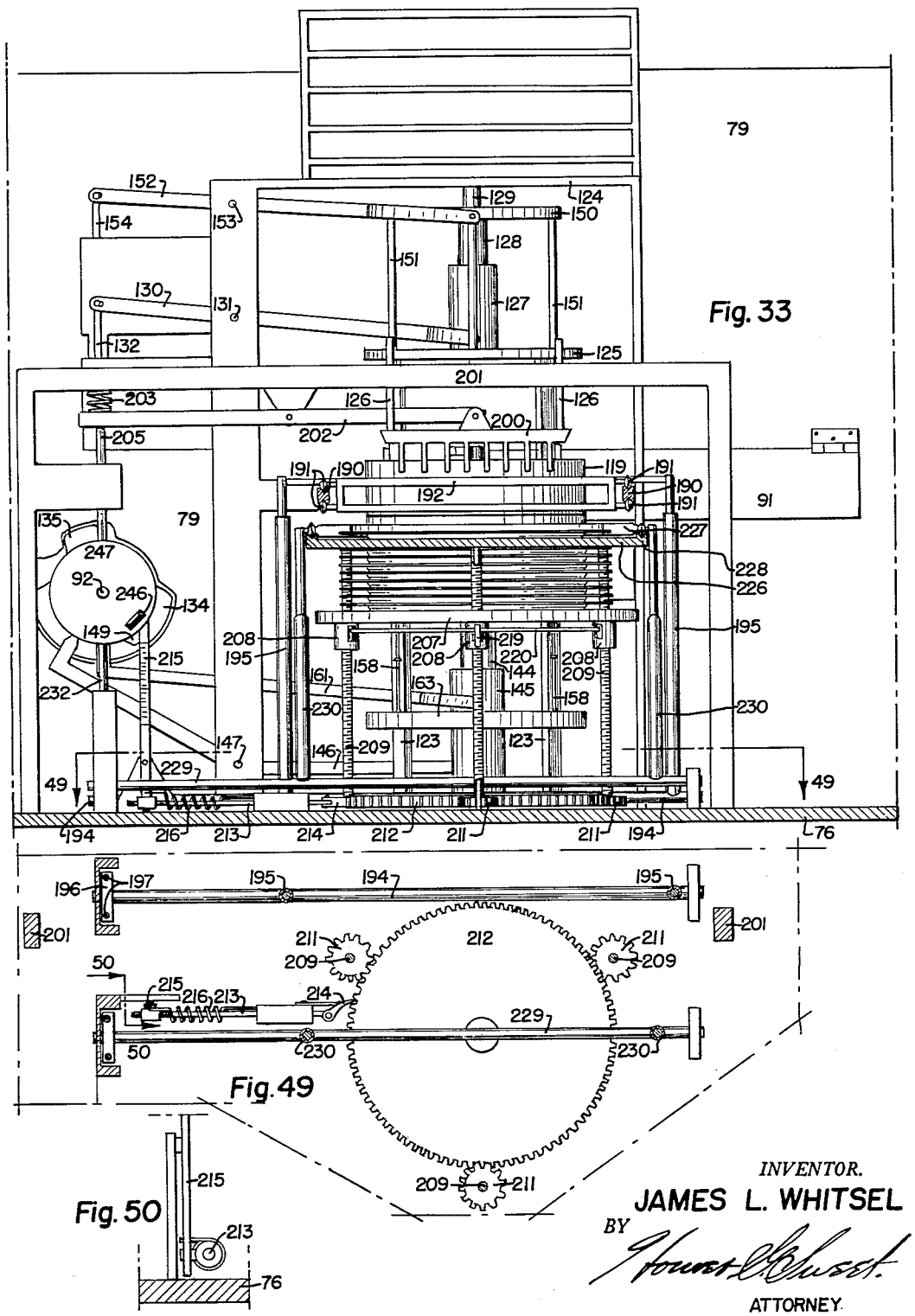
Figures 51, 52:
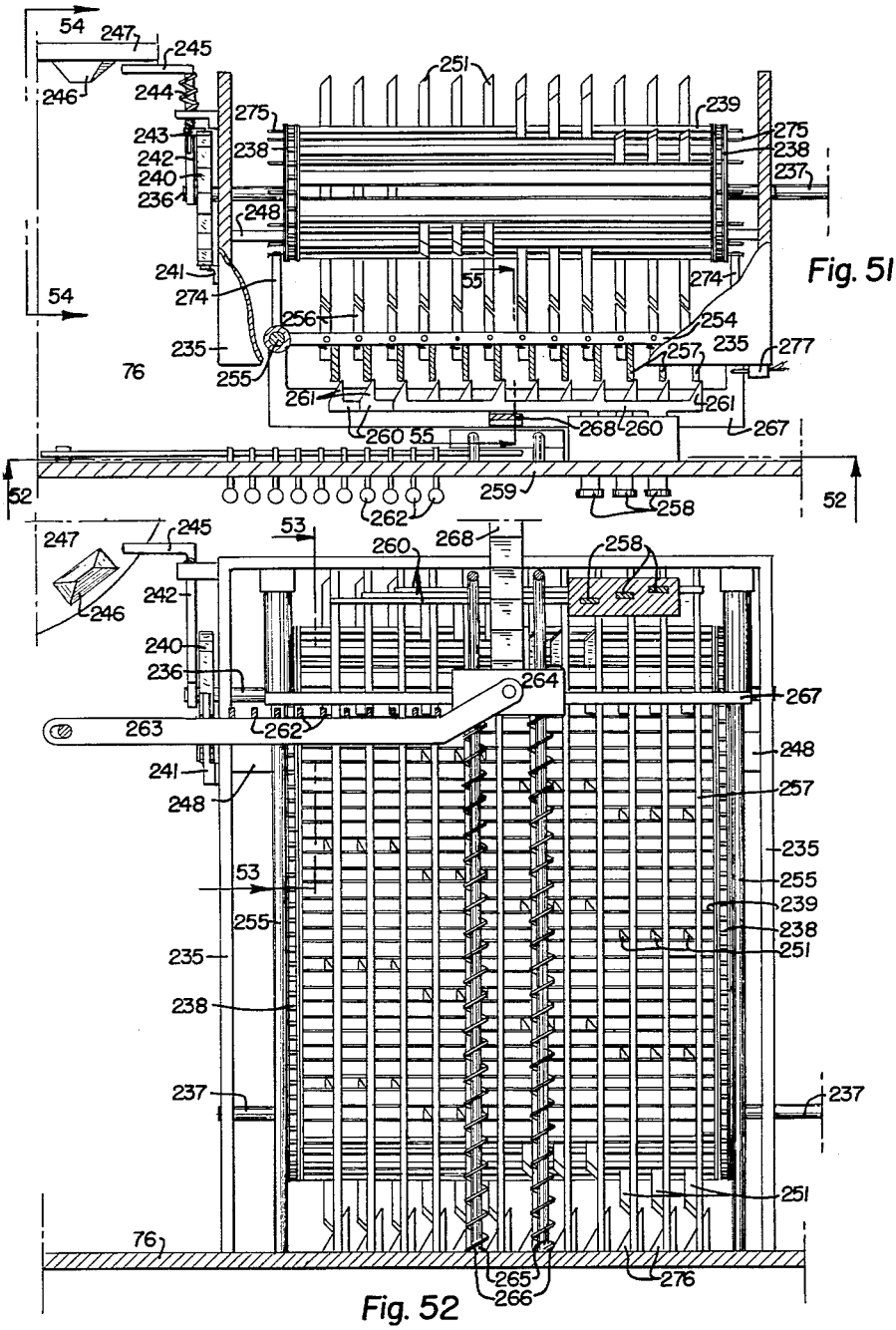
Figure 60:
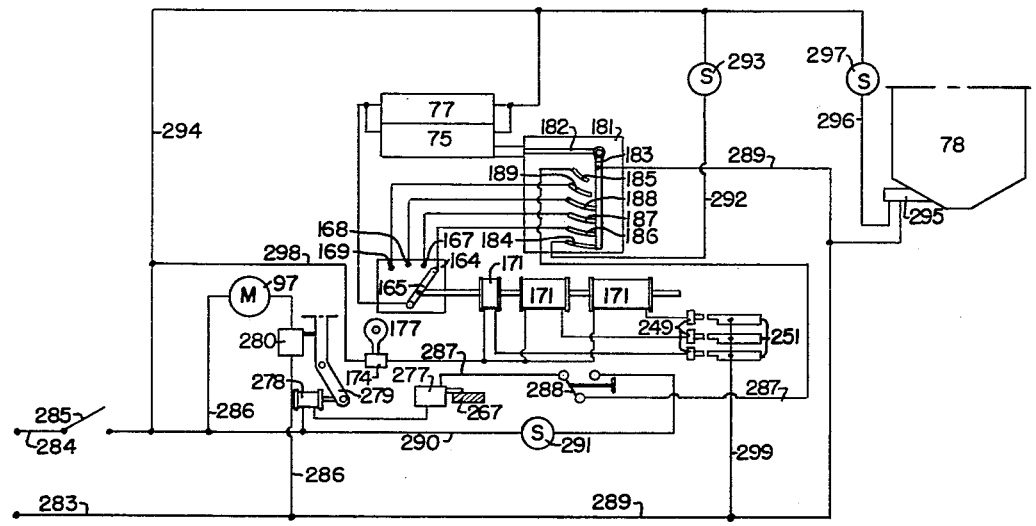
Figure 59:
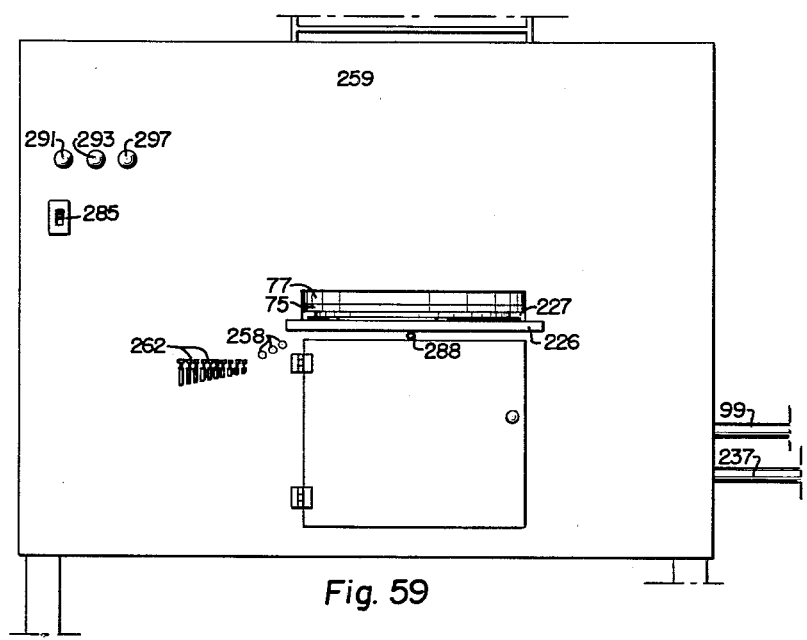

Figure 1 is a side elevation of a typical embodiment of the invention as assembled ready for practical use. Figure 2 is a plan view of the organization according to Figure 1. Figure 3 is a cross section, on an enlarged scale, taken substantially on the indicated line 3—3 of Figure 2. Figure 4 is a fragmentary, detail section on the same scale as and taken substantially on the indicated line 4—4 of Figure 3. Figure 5 is a fragmentary view of certain elements of Figure 4 in an alternative operative relationship determinative of reaction to element shift as indicated by the broken line showing. Figure 6 is a fragmentary, detail section taken substantially on the indicated line 6—6 of Figure 3. Figure 7 is a fragmentary, detail elevation of structure as viewed from the zone substantially indicated by the line 7—7 of Figure 4. Figure 8 is a fragmentary, detail section, on a further enlarged scale, taken substantially on the indicated line 8—8 of Figure 3. Figure 9 is a fragmentary, detail section, on a relatively enlarged scale, taken substantially on the indicated line 9—9 of Figure 4. Figures 10 and 11 are detail elevations, on like relatively enlarged scales, of cam and follower arrangements illustrated in Figures 3 and 4. Figure 12 is an elevation, on a relatively enlarged scale, of the right-hand end of the organization shown in Figure 1 from the side opposite to that of the Figure 1 showing. Figure 13 is a fragmentary, detail section, on a further enlarged scale, taken substantially on the indicated line 13—13 of Figure 12. Figure 14 is a top plan view of the arrangement according to Figure 13. Figure 15 is a fragmentary, detail section taken substantially on the indicated line 15—15 of Figure 12. Figure 16 is a transverse section, on a relatively enlarged scale, taken substantially on the indicated line 16—16 of Figure 2. Figure 17 is a fragmentary, detail section taken substantially on the indicated line 17—17 of Figure 16. Figure 18 is a fragmentary, detail section taken substantially on the indicated line 18—18 of Figure 17. Figure 19 is a fragmentary, detail section taken substantially on the indicated line 19—19 of Figure 16. Figure 20 is a fragmentary, detail section taken substantially on the indicated line 20—20 of Figure 19. Figure 21 is a fragmentary, detail section, on an enlarged scale, taken substantially on the indicated line 21—21 of Figure 1. Figure 22 is a fragmentary, detail section, on a relatively enlarged scale, taken substantially on the indicated line 22—22 of Figure 19. Figure 23 is a detail similar to Figure 22 taken substantially on the indicated line 23—23 of Figure 19. Figure 24 is a detail similar to Figure 22 taken substantially on the indicated line 24—24 of Figure 19. Figure 25 is a detail similar to Figure 22 taken substantially on the indicated line 25—25 of Figure 19. Figure 26 is a detail plan view taken substantially on the indicated line 26—26 of Figure 21. Figure 27 is a cross section taken substantially on the indicated line 27—27 of Figure 26. Figure 28 is a cross section taken substantially on the indicated line 28—28 of Figure 26. Figure 29 is a cross section taken substantially on the indicated line 29—29 of Figure 28. Figure 30 is a fragmentary, detail section, on a relatively enlarged scale, taken substantially on the indicated line 30—30 of Figure 26. Figure 31 is a partial plan view, on a relatively enlarged scale and partially in section, taken substantially on the indicated line 31—31 of Figure 1. Figure 32 is a cross section taken substantially on the indicated line 32—32 of Figure 31. Figure 33 is a cross section, on a further enlarged scale, taken substantially on the indicated line 33—33 of Figure 2. Figure 34 is a fragmentary, detail section, on a relatively enlarged scale, taken substantially on the indicated line 34—34 of Figure 31. Figure 35 is a fragmentary plan view of the right-hand end of the Figure 34 showing as associated with elements operatively correlated therewith. Figure 36 is a cross section taken substantially on the indicated line 36—36 of Figure 35. Figure 37 is a detail elevation, partly in section, of typical heat-controlled switch means employed in and with the invention. Figure 38 is a section taken substantially on the indicated line 38—38 of Figure 37. Figure 39 is a fragmentary, detail section, on a relatively enlarged scale, taken vertically through plate stack supporting and elevating means shown in Figures 32 and 33. Figure 40 is a fragmentary detail, on a relatively enlarged scale, of the thread clutch and release means shown at the right-hand end of Figure 39. Figure 41 is a fragmentary, detail elevation of the organization shown at the right-hand end of Figure 39. Figure 42 is a detail elevation, partly in section and on a relatively enlarged scale, of a cam assembly and associated means as viewed from approximately the line 42—42 of Figure 31. Figure 43 is a fragmentary, detail section, on a relatively enlarged scale, taken substantially on the indicated line 43—43 of Figure 42. Figure 44 is a view similar to Figure 43 taken substantially on the indicated line 44—44 of Figure 42. Figure 45 is a view similar to Figure 43 taken substantially on the indicated line 45—45 of Figure 42. Figure 46 is a view similar to Figure 43 taken substantially on the indicated line 46—46 of Figure 42. Figure 47 is a view similar to Figure 43 taken substantially on the indicated line 47—47 of Figure 42. Figure 48 is a fragmentary, detail section, on a relatively enlarged scale, taken through plate shifting means similarly illustrated in Figure 32. Figure 49 is a fragmentary, detail section taken substantially on the indicated line 49—49 of Figure 33. Figure 50 is a fragmentary, detail section, on a relatively enlarged scale, taken substantially on the indicated line 50—50 of Figure 49. Figure 51 is a fragmentary, detail plan, on a relatively enlarged scale and with certain elements broken away to disclose otherwise concealed construction, of control means as viewed from approximately the indicated line 51—51 of Figure 1. Figure 52 is a cross section taken substantially on the indicated line 52—52 of Figure 51. Figure 53 is a cross section taken substantially on the indicated line 53—53 of Figure 52. Figure 54 is a fragmentary, detail elevation of ratchet drive means as viewed from approximately the indicated line 54—54 of Figure 51. Figure 55 is a fragmentary, detail section, on a relatively enlarged scale, taken substantially on the indicated line 55—55 of Figure 51. Figure 56 is a fragmentary, detail section taken substantially on the indicated line 56—56 of Figure 55. Figure 57 is a fragmentary, detail section, on a relatively enlarged scale, taken substantially on the indicated line 57—57 of Figure 53. Figure 58 is a fragmentary, detail section taken substantially on the indicated line 58—58 of Figure 53. Figure 59 is an elevation of the left-hand end of the organization according to Figure 1. Figure 60 is a conventionalized diagram of the electrical elements and connections employed in and with the improvement.

In conformity with customary practice, the waffles produced by the improved apparatus are cooked on and by a suitably patterned, heated iron which may be considered the operative center wherewith the other elements of the apparatus are operatively associated, and such an iron, hereinafter more specifically described, is represented in the drawings as comprising a lower member 75 fixedly supported from and upstanding from a fixed frame or table 76 with its top surface horizontal in elevated relation for registered cooperation at times with an upper member 77 altitudinally shiftable into and out of engagement therewith; the registrable and interengageable faces of the members 75 and 77 being recessed and patterned, as hereinafter described, to cooperatively define a waffle-cooking chamber.

*Supply and delivery of battery*

The waffle batter to be employed is premixed in desired quantity according to a preferred recipe and to a consistency appropriate for gravity feed and flow thereof, and is thereafter charged in suitable supply interiorly of a reservoir, indicated generally at 78, fixedly supported from and in elevated relation with the frame or table 76 at one side of the cooking iron and with its bottom above the plane of the upper face of the iron lower member 75; a partition 79, conveniently a part of the reservoir support, being interposed between the reservoir and cooking iron in upstanding relation from the frame or table to minimize the effect of heat emanations from the cooking iron on the reservoir contents.

The reservoir 78 is preferably constituted from a cylindrical, open-top, axially-vertical, outer casing 80 closed by means of a removable upper end cover 81 and a coaxial, cylindrical, open-top, inner vessel 82 whose walls and bottom are spaced from and interiorly of the casing 80 to provide a space for the accommodation of coolant or refrigerant about said vessel 82 and in preserving relation wtih the vessel contents. The vessel 82 is desriably formed from easily cleansed material non-reactive to the batter it is designed to contain, and the bottoms of the casing 80 and vessel 82 are preferably similarly and conically depressed for drainage of contents to the bottom centers, whence escape of drainings from the casing 80 may be controlled through a drain cock 83. A tubular sleeve 84 fixedly upstands about an opening at the center of the bottom of casing 80 for the telescopic reception of a tubular outlet neck projection 85 depending from and about an opening centrally in the bottom of vessel 82, such sleeve and neck interengagement serving to operatively mount the vessel 82 for convenient removal and replacement relative to the casing 80 and for gravity discharge of its contents interiorly of the sleeve. Below the outlet neck 85, the sleeve 84 is substantially filled by and rotatably mounts the intake end 86 of a tubular delivery arm 87, said intake end 86 being adapted to turn about its axis in the sleeve 84 in maintained registration with the neck 85 and being angularly related with its associated arm 87 in a manner to dispose the latter in a generally radial extension away from the axis of vessel 82 below the reservoir 78 for rotation with said intake end 86 and at a slight inclination to the horizontal such as will induce gravity flow of batter from the vessel 82 through said arm 87 and to the end thereof remote from said vessel. A spigot body 88 is mounted, preferably for convenient removal and replacement in the interest of cleaning and sterilization, on the free end of the arm 87 well beyond the outer zone of the reservoir casing 80 and is arranged to downwardly direct outflow from said arm, and said spigot is furnished with a valve element 89 rotatable about a horizontal axis in said body for selective regulation and control of outflow through the spigot with a minimum of drip effect. One end of the axis mounting the valve element 89 projects exteriorly of the spigot body and engages with a radially associated arm 90 whereby the flow-controlling position of said valve element may be regulated and adjusted.

The length of the arm 87 and its associated spigot 88 radially of and away from the axis of rotation of its neck 86 is so proportioned to the spacing between the cooking iron comprised of the members 75 and 77 and the reservoir 78 as to register the orbit of the spigot discharge outlet with the center of the cooking iron, whereby to provide for delivery of batter from said spigot discharge to the center of the cooking iron in one angularly adjusted position of arm 87, and the altitudinal disposition of the spigot discharge is so correlated with the elevation of the upper surface of iron member 75 as to provide a suitable operative spacing therebetween when the spigot is registered over and for delivery to said iron member surface, it being manifest that such delivery registration of the spigot with the iron member is possible only when the iron upper member 77 is elevated well away from the lower member 75 in the manner and through the agencies hereinafter elaborated.

Angular adjustment of the arm 87 from a normal inoperative position substantially paralleling the partition 79 to a position of intersection with and extension through said partition for delivery registration of its spigot 88 with the iron lower member 75 is accommodated through a suitably disposed, laterally elongated opening in said partition normally closed by means of a flap 91 hinged at its upper margin to the side of said partition remote from the reservoir 78 and thus mounted to swing upwardly away from and to uncover said partition opening when engaged by said spigot as an incident of arm angular adjustment in one direction and to recover said opening when the arm is withdrawn away from extension through the partition as a consequence of its angular travel in the other direction. Angular adjustment of the arm 87 and actuation of the spigot valve 89 are had in synchronism with the operative cycle of the apparatus through the agency of cams carried by and for rotation with a shaft 92 perpendicularly intersecting the partition 79 above and along one side of the frame or table 76 and mounted for rotation with its axis horizontal in journal-equipped brackets 93 upstanding from said frame or table. At its end adjacent the reservoir 78, the shaft 92 shiftably mounts a clutch member 94 in driving relation therewith and aligned with a separate rotatably mounted shaft 95 end spaced therefrom and furnished with a fixedly related clutch member 96 complementary to and disposed for cooperating engagement at times with the member 94, so that, when the clutch member 94 is shifted axially of its mounting shaft 92 into engagement with the clutch member 96, the shafts 92 and 95 are coupled for synchronous, simultaneous rotation. Power rotation of the shaft 95 derives from an electric motor 97 fixed to the frame or table 76 with its axis perpendicular to that of said shaft and operable through a spur gear train 98 to rotate an axially parallel shaft 99 furnished with a worm underlying and meshing with a worm gear 100 carried by the shaft 95, through which arrangement operation of the motor 97 is at all times productive of simultaneous rotation of the shaft 95 at a reduced speed suitably proportioned to that of said motor. The shaft 99 of the arrangement shown and described may be extended, as indicated, for driving engagement with appropriate elements of multiple like apparatus units thereby operatively linked to and synchronously correlated with a single power unit' Adapting the arm 87 and its valve element 89 for desired operative reaction to a phase of rotation of shaft 92, a spindle 101 rotatably upstands from the frame or table 76 beneath and coaxial with the reservoir 78 to mount, preferably in splined relation with its upper end, a bracket 102 whereupon the arm 87 is seated and secured. A gear 103 fixed to a lower portion of the spindle 101 meshes with a rack 104 on and movable with a member 105 slide-mounted for reciprocation in a path perpendicular to the shaft 92, and a rigid, upwardly-directed extension 106 of said member 105 terminates in a follower against and reactive to the marginal outline of a cam 107 fixed to the shaft 92. The cam 107 is formed with a circular marginal outline concentric with the shaft 92 extending through two hundred and eighty-five degrees of arc against which the member 105 and finger 106 terminal follower is held by the pressure of an expansive spring 108 to position the rack 104 at that limit of its reciprocatory range determinative of the disposition of arm 87 on the side of the partition 79 away from the iron member 75 and out of delivering registration therewith, and a single, radial lobe 109 fills the remaining seventy-five degrees of arc of cam 107 in a marginal outline arrangement effective through the terminal follower to shift the member 105—106 and associated rack 104 during thirty degrees of cam rotation against the pressure of the spring 108 a distance sufficient to rotate the spindle 101 and arm 87 into delivering registration of the spigot 88 with the iron lower member 75, to hold the so-positioned arm and spigot in such delivering registration during a further thirty degrees of cam rotation, and to permit return of said arm and spigot to initial position through the agency of the spring 108 during the remaining fifteen degrees of cam rotation; said cam lobe 109 hence having a projection beyond the cam's circular margin equalling the length of requisite travel of rack 104 and an end margin of thirty degrees of arc circularly concentric with the shaft 92. During the interval of arm 87 and spigot 88 delivering registration with the iron member marked by engagement of the cam lobe 109 with the appropriate follower, the valve 89 of the spigot is automatically opened for a predetermined interval and then closed to deposit a charge of batter on the iron member surface, in the manner and through the agencies hereinafter described. A stem 110 reciprocably mounted through the bracket 102 at one side of and in general parallelism with the arm 87 is linked at one end to the free end of the valve arm 90 and projects at its other end well beyond the axis of spindle 101 in normal reaction to a retractile spring 111 operable as a consequence of its connection between the outer end of said bracket and the end of the stem linked to said valve arm to hold said stem at the limit of its projection beyond the spindle axis and away from the spigot 88 and to thereby position the arm 90 for outflow-closing adjustment of the valve 89, in which relation of the associated elements shift of the stem 110 against the pressure of the spring 111 operates to swing the arm 90 and open outflow through the valve 89. To effect such shift of the stem 110 in automatic reaction to rotation of shaft 92 when the arm and spigot are appropriately registered for delivery, a plate 112 centered and independently rotatable on the mounting boss of the bracket 102 is furnished with an arcuate marginal web 113 fixedly upstanding across the projected path of reciprocation of stem 10 in an eccentricity with the spindle 101 axis effective to space the margin of web 113 more nearly adjacent the shaft 92 a maximum distance from said spindle axis and the web margin remote from said shaft a much less distance radially from said spindle axis. The plate 112 carrying the web 113 is connected by means of a link 114 to and for reaction to displacement of a slide-mounted yoke 115 terminating in a cam follower directed oppositely to and on the side of the shaft 92 opposite from the cam follower of the member 105—106 and disposed for engagement with and reaction to the marginal outline of a cam 116 fixed to said shaft in adjacent parallelism with the cam 107, an expansive spring 117 being operatively associated with the yoke 115 to resiliently urge the yoke follower against the margin of cam 116. The cam 116 has a circular outline concentric with the shaft 92 throughout three hundred and thirty degrees of arc and the linkage between the plate 112 and yoke 115 is so adjusted as to position said plate with the greater radius of its web 113 substantially aligned with the axis of the arm 87 when the latter is swung to delivery registration with the iron lower member 75 and hence located to receive and accommodate the adjacent end projection of stem 110 without application of stem-shifting pressure thereto when the arm carrying said stem is first swung to its position of batter delivery. The arc of web 113 eccentrically approaches the axis of spindle 101, and being at the side of the end projection stem 110 remote from the cam 116 when the arm 87 is positioned for delivery of batter to the iron lower member 75, shifting of the link 114 toward the shaft 92 operates to swing the plate 112 for camming action of its web 113 on the end projection of stem 110 effective to shift said stem against the pressure of the spring 111 and open the valve 89 for batter outflow therethrough, and such shift of the link 114 is a function of the cam 116 in its rotation with the shaft 92. To shift the link 114 for opening of the valve 89 in appropriate correlation with the registration of arm 87 and iron member 75, the cam 116 is furnished with a single, radial lobe 118 outstanding through thirty degrees of cam arc in diametrically opposite registration on the shaft 92 with the thirty degree end arc of the lobe 109 on the cam 107; said lobe 118 having a radial projection beyond the cam's circular arc margin effective through the agencies and relationships shown and described to fully open the valve 89, a circular end arc proportioned to hold said valve open through a major portion of the cam's thirty degree arc represented by said lobe, and steeply pitched sides for quick shift and return of the follower-equipped yoke 115.

As shown and described, the cams 107 and 116 function to swing the arm 87 to delivering registration with the iron member 75 during a first thirty degrees of rotation of shaft 92, to hold said arm in such registration and to simultaneously open, hold open, and close the valve 89 for outflow of a charge of batter to the iron member during the next subsequent thirty degrees of shaft rotation, to return the arm 87 out of registration with the iron member during the next subsequent fifteen degrees of shaft rotation, and to retain the said arm, valve, and associated elements in their inoperative positions and relationships throughout the remaining two hundred and eighty-five degrees marking one complete revolution of said shaft.

*Cooking iron arrangement and operation*

The complementary lower and upper members, 75 and 77 respectively, of the cooking iron assembly may be of any appropriate and desired form and construction, circular, square, triangular or rectangular in plan, definitive of coactable units having mating faces enclosing a cooking chamber when the members are interengaged, compartments backing their mating faces, and electrical heating elements in said compartments, the such members typically represented in the drawings being circular in plan, similarly constituted from shallow, cylindrical shells 119 having closed outer end bases 120, recessed mating faces 121 in spaced parallelism with the bases 120 for coaction in defining the cooking chamber, and heating elements 122 insulated from and adjacent the bases 120 interiorly of the compartments between said bases and the adjacent faces 121. The lower iron member 75 is fixedly supported with its face 121 horizontal in an upward exposure adjacently below the swing path of the arm 87 by means of spaced struts 123 upstanding from the frame or table 76, and the upper iron member 77 is reciprocably engaged with a fixed frame element 124 spacedly paralleling said frame or table for altitudinal adjustment of its downwardly exposed face 121 into and out of coacting registration with the complementary face of the member 75. To reciprocably mount and guide the iron member 77, a plate 125 approximately coextensive in area with the said member is fixedly associated therewith in spaced, parallel relation with the base 120 thereof by means of struts 126 and is furnished with a tubular, coaxial hub 127, whereof the bore opens through the plate, projecting from the plate side remote from the member 77 in sliding engagement through the agency of an independently slidable, intermediate sleeve 128 with a stem 129 fixedly depending from the frame element 124 in axial alignment with the iron assembly.

The hub 127 being free to slide axially on the sleeve 128 and hence relative to the stem 129, regulation of the height of member 77 is had in automatic synchronism with other apparatus operations through the agency of a lever 130 hingedly engaged at its yoked inner end with said hub 127 and mounted for oscillation in a vertical arc about a fixed fulcrum 131 on one of the legs of frame member 124 in perpendicular relation with and at its outer end spacedly overhanging the shaft 92. A rod 132 slide mounted for altitudinal reciprocation through a bracket fixed on said leg of member 124 above the shaft 92 is hinged at its upper end to the outer end of the lever 130, has a cam follower at its lower end, and is resiliently urged by means of a spring 133 for engagement of its cam follower against and for reaction to the periphery of a cam 134 fixed to and for rotation with the shaft 92, the pressure of the spring 133 being adequate to rock the lever 130 for elevation of the iron member 77 assembly when shift of the rod 132 toward the shaft 92 is permitted by said cam. The periphery of cam 134 traced by the follower end of the rod 132 is contoured to provide a lobe 135 projecting radially of the shaft 92 a distance operable when engaged under the rod 132 to elevate said rod for closing of the iron member 77 into registered engagement with the iron member 75 and so disposed circumferentially of the cam 134 as to position its rotationally trailing corner under said rod at the point or phase of rotation of shaft 92 initial to the operative cycle of the apparatus. The rotationally trailing side of the cam lobe 135 is inclined inwardly of the cam body through fifteen degrees of arc to merge into a circular cam margin concentric with the shaft 92 and of radius appropriate to accommodate spring-urged downward shift of the rod 132, with consequent proportioinal elevation of the iron member 77, and to limit the downward shift of said rod to establish a separation of the iron members 75 and 77 adequate for free swinging of the arm 87 therebetween and into delivering registration with the fixed iron member 75. The circular arc of the margin of cam 134 trailing the lobe 135 occupies sixty degrees of arc subsequent to the fifteen degrees of initial cam rotation, thereby functioning to maintain the iron members in separation while the cams 107 and 116 operate during the same phase of rotation of shaft 92 to swing the arm 87 into delivering registration with the iron member 75, to open and close the valve 89 controlling flow through said arm, and to return the arm to its inoperative position on the side of the partition remote from the cooking iron assembly. The iron member 75 being charged with batter and the charging agencies cleared therefrom after seventy-five degrees of rotation of shaft 92 and cam 134, the margin of said cam is inclined from the end of its first circular arc portion of reduced radius through an arc of fifteen degrees to junction with a circular arc portion of radius equal to that of the lobe 135 and extending through an arc of one hundred and eighty degrees, such cam marginal outline operating through the rod 132 upon further rotation of shaft 92 to close the iron member 77 into coacting registration with the charged iron member 75 and to hold said members in such relationship during a half revolution of the shaft 92 while heat is developed through the elements 122 of said members for cooking of the batter as hereinafter described. At two hundred and seventy degrees of arc from the rotationally trailing corner of the lobe 135, the margin of cam 134 is again inclined inwardly through fifteen degrees of arc to a circular arc portion of thirty degrees concentric with the shaft 92 and of the same radius as the circular arc portion immediately trailing the lobe 135 and hence operable to accommodate shifting of rod 132 for full elevation of the member 77 away from its complementary member 75, said thirty degree circular arc of reduced radius closing at its trailing end against the leading margin of the lobe 135 which inclines through fifteen degrees of arc to intersection with the circular arc end margin of the lobe 135 thereby determined in an arc of thirty degrees. As it traces the so contoured periphery of the cam 134 during one revolution of the shaft 92, the rod 132 operates through the linkage above described to lift the member 77 away from the member 75, to hold said member 77 elevated relative to the member 75 during sixty degrees of rotation of shaft 92, to close said member 77 into coacting registration with the member 75, to hold said member 77 closed against the member 75 during one hundred and eighty degrees of shaft rotation, to again elevate the member 77 away from the member 75 and to hold it in such separation through thirty degrees of shaft rotation, and to finally reclose the member 77 against the member 75 and maintain such relationship during the thirty degrees completing one revolution of said shaft. The first separation of the iron members 75 and 77 accomplished through the agency of the cam 134 accommodates delivery of a batter charge to the iron 75 as above described, the prolonged first period of iron member interengagement is utilized for cooking of the batter as hereinafter set forth, the second separation of the iron members permits removal and transfer of the cooked product therefrom, and the final closing of the iron members together at the completion of their operative cycle conditions the cooking unit for conservation of heat, protection against soilage during the inoperative portion of the cycle of operation of the apparatus, and for reinitiation of the operative cycle.

The mating faces 121 of the iron members 75 and 77 are conventionally alike in a form and arrangement usual to waffle irons and typically present interengageable peripheral shell margins 119 defining and enclosing a recessed area, perpendicularly-related, radial ribs 136 symmetrically dividing said recessed area and terminating at their outer ends in the shell wall with their axially-directed, free edges defining a plane spaced inwardly of the member slightly from the plane determined by the peripheral margin of the associated member, whereby to leave a narrow clearance between opposed edges of the ribs 136 approached and registered when the iron members 75 and 77 are closed together, and the areas of face 121 between the ribs 136 are further offset inwardly of the member to a plane spacedly paralleling that of the free edges of associated rib 136 and grid-patterned by grooves and channels in a preferably perpendicular intersection to develop the form and arrangement of frusto-pyramidal bosses 137 characteristic of waffle iron cooking faces. In the use of the ribbed and grid-patterned iron member cooking faces, batter charged onto the face of the member 75 spreads by virtue of its consistency and the pressure of the member 77 closed thereagainst, and expands under the influence of cooking heat, to fill the grooves and channels outlining the bosses 137 and to close over and about the ribs 136 until all space within the peripheral margins and between the faces 121 is occupied; such spreading and expansion of the batter coacting with the form of the cooking faces to develop extensive surface engagement of the cooked waffle with the said faces and a consequent difficulty in separating the cooked product from the iron members as an automatic operation correlated with cyclic separation of the iron members as above described. Release of the cooked waffle from the iron faces and elevation of the waffle into position for transfer away from the iron assembly is automatically accomplished by the means and agencies illustrated and hereinafter described. In both of the members 75 and 77, parallel groups of the face grooves or channels 121 outlining the bosses 137 are formed to provide parallel slots opening into the member compartment containing the heating element 122, and bars 138, of modified wedge-shape in cross section, are loosely engaged in and to fill said slots with the margins of each bar 138 opposed to the waffle batter in the same plane as the bases of the unslotted grooves and channels and in a mounting seating said bars in such relationship at the limit of their movement axially of the member toward the heating element 122 and permitting shift of said bars in their slots and outwardly of the face 121 through their seating groove and channel slots. When seated in their respective slots and grooves at the limit of their shift range away from the face 121 of the associated iron member, the margins of each bar 138 remote from said face similarly extend within the member compartment accommodating the heating element 122 and there engage with, and are preferably heat-insulated from, ribs 139 fixedly outstanding in spaced, parallel relation from a grid 140 within and shiftable axially of the member compartment between the face 121 and base 120 thereof, each of said ribs 139 bridging chordally of the member beneath and in engagement with an aligned pair of the bars 138 for simultaneous, like reaction of all the bars 138 of each member to shift of the associated grid 140 axially of the member compartment. As thus arranged, shift of the grid 140 of either member 75 or 77 toward the base 120 of the member operates to seat all of the associated bars 138 at the limit of their retraction away from the member face 121 and in position to complete the batter-receiving floor of said face, while shift of said grid axially of said member and toward the face 121 thereof operates to extend said bars 138 axially and outwardly of the member face between the bosses 137 thereof for consequent separation of cooked waffle material from the member face; such shift of the grid 140 operating in the member 77 to release the cooked waffle therefrom when the member is elevated and operating in the member 75 not only to release the cooked waffle but also to elevate the latter above and into clearing relation with the said member margin.

Shift of the grids 140 axially of their respective iron members for release and elevation of the cooked waffle is an automatic function deriving from rotation of the shaft 92 in synchronism with the cyclic separation of the iron members as above described. Each of the grids 140 is furnished with a plurality of like, spacedly-parallel fingers 141 fixedly outstanding perpendicularly from the plane thereof in slidable accommodation through apertured bosses on and adjacent the margins of the iron member bases 120, the fingers 141 of the grid in the lower iron member 75 depending through and extending below the base of said member so that the weight of the shiftable grid assembly of said member operates to normally dispose the grid in its lowermost position and the associated bars 138 in batter-receiving relation with the member face 121, while the fingers 141 of the upper iron member 77 extend through and upwardly beyond the base of said member and through loading springs 142 arranged to yieldably hold the shiftable grid assembly of said upper member in its uppermost position and adjacent the base of the member with the associated bars 138 retracted to their seats in the member face 121. A plate 143 horizontally underlies and engages the free ends of the fingers 141 depending from the lower iron member 75 in altitudinally reciprocable relation within the cage of the struts 123 and is formed with a centrally-depending stem 144 slidably and telescopically engaged within a tubular socket 145 fixedly upstanding from the table 76 in coaxial registration with and spacedly below said member, and a slot longitudinally of said socket and opening radially through the base thereof is traversed by one end of a lever 146 therein accommodated for oscillation in a vertical plane in end engagement beneath and for altitudinal adjustment of the lower end of stem 144. The lever 146 is mounted to rock about a frame-fixed fulcrum 147 between the shaft 92 and socket 145 with its end remote from said socket constituted as a follower reactive to the contoured periphery of a cam 148 fixed to and rotatable with the shaft 92. It being the function of the cam 148 to rock the lever 146 about its fulcrum 147 for elevation of the plate 143 and the lower iron member grid assembly reactive thereto after a waffle has been cooked between the iron members and during the interval of iron member separation marking the end of the cooking operation, said cam is contoured throughout a major portion of its periphery to a circular arc concentric with the shaft 92 and of a radius reactive through the lever 146 to position the plate 143 at that lower limit of its altitudinal range corresponding with the lowermost position of the iron member 75 grid assembly and is formed with a single radial lobe 149 having similarly and suitably sloped leading and trailing margins and an arcuate end projection concentric with the shfat 92, the circumferential extent of said lobe 149 and its margins, as well as the fixed relation of said lobe angularly of the shaft 92, being correlated with the cam outline and position of the cam 134 so as to rock the lever 146 for elevation of the plate 143 and consequent elevation of the iron member 75 grid assembly synchronously with elevation of the iron member 77 away from the member 75 as controlled by and deriving from rotation of cam 134, to hold the member 75 grid assembly elevated in support of the cooked waffle above the member's upper margin during the interval of iron member separation immediately subsequent to cooking of the waffle, and to lower the plate 143 and member 75 grid assembly just prior to closing of the iron members together through the agency of the cam lobe 135. Reactive to rotation of shaft 92 in operative correlation with the means for separating the iron members and for shifting the grid assembly of the lower such member, the means for shifting the grid assembly of the upper iron member 77 to effect release of the cooked waffle therefrom includes a plate 150 fixed to and extending radially from the upper end of the sleeve 128 slidable on the stem 129 within the hub 127, said plate 150 spacedly paralleling the plate 125, and elongate studs 151 are fixed in spaced relation angularly about and adjacent the margin of said plate 150 to depend perpendicularly therefrom in slidable intersection with the plate 125 in registration and for end engagement at times with the spring-loaded fingers 141 upstanding through and beyond the base 120 of the iron member 77. A lever 152 mounted for oscillation in a vertical plane about a frame-fixed fulcrum 153 is formed with a yoked end hingedly engaging the plate 150 and with a spring-loaded follower stem 154 hingedly depending from its other end through a suitable guide to end registration against the periphery of a cam 155 fixed to and rotatable with the shaft 92 adjacent the cam 134, the spring loading of the follower stem 154 operating to yieldably urge the lever 152 to the position of maximum elevation of plate 150 permitted by the peripheral contour of cam 155. Approximating the operative characteristics of the cam 134 for altitudinal adjustment of the plate 150 and studs 151 correlated with the altitudinal adjustment of the iron member 77 as controlled by the cam 134, the periphery of said cam 155 is contoured to provide a radial lobe 156 operatively registered with the cam lobe 135 axially of the shaft 92 and operable through the follower 154 to shift the plate 150 and studs 151 to a lower limit of their adjustable range and hold them in such disposition as and when the iron member 77 is closed against the member 75 during the cyclic phase just prior to supply of batter to the iron assembly. Trailing the lobe 156 in the direction of rotation of shaft 92, a cam 155 having a circular arc margin of reduced radius is registered with the similar arc of the cam 134 and operates to permit elevation through the appropriate linkage of the plate 150 and studs 151 to an upper limit of their adjustable range in synchronism with elevation of the iron member 77 away from the member 75, a circular arc margin of radius the same as that of the lobe 156 is registered with and extended circumferentially beyond the similar semi-circumferential arc of the cam 134 to return the plate 150 and studs 151 to the lower limit of their adjustable range and so hold them during and for an interval beyond the time that the iron members are closed together for cooking purposes, and a short circular arc of reduced radius directly leads the said lobe 156 for accommodation of elevation of plate 150 and stud 151 to their upper limiting position in registration with the trailing portion of the similar arc on the cam 134 and for retraction of the plate and stud assembly away from the iron member 77 when the latter is in opened relation away from the member 75 just subsequent to completion of the cooking operation. As so contoured, the periphery of the cam 155 reflects cam rotation with the shaft 92 through the follower 154 and associated linkage to elevate and lower the plate 150 and studs 151 in synchronous correlation with altitudinal travel of iron member 77 deriving from the cam 134 save for that interval of the cycle marked by initial elevation of the member 77 away from the member 75 at the end of the cooking period represented by the semi-circular arc of increased radius on the cam 134, during which interval the circumferential extension of the arc of increased radius on the cam 155 trails in the direction of rotation of shaft 92 beyond the similar, circumferentially-shorter arc of the cam 134 and operates to hold the plate 150 and studs 151 at the lower limit of their travel range as the said member 77 is moved from the lower and to the upper limit of its travel range at the end of the cooking period. In their synchronous travel relation with the member 77, the lower ends of studs 151 are uniformly spaced from and in maintained registration with the ends of fingers 141 projecting above said member a distance so proportioned to the member travel range as to interengage said stud and finger ends for shift of said fingers against the pressure of their springs 142 and corresponding shift of the associated grid assembly 138—140 within and relative to the member 77 as the latter is elevated away from the member 75 while the extended arc of cam 155 holds the plate 150 and studs 151 at the lower limit of their travel range; such shift of the member 77 grid assembly extending the bars 138 thereof away from their seats in the member cooking face for consequent release of the cooked waffle from said member as an incident of member 75 and 77 separation at the end of the cooking period. As is manifest from the operative organization and correlation of the cams 134, 148 and 155 as shown and described, completion of the cooking period as determined by shaft rotation of said cams is marked by elevation of the iron member 77 away from the member 75, simultaneous elevation of the member 75 grid assembly for release of the cooked waffle from said latter member and elevation thereof on the bars 138 above the member's upper face while the waffle remains and is held in engagement with the lower face of the upwardly-moving member 77, shift of the member 77 grid assembly for release of the waffle from said member and to sole support on the bars 138 of the lower member grid assembly as an incident of raising of member 77 correlated with full elevation of the lower member 75 grid assembly, retraction of the member 77 grid assembly to its normal seat in said member and to leave the waffle in supported elevation between the iron members when the latter attain their maximum separation, and ultimate retraction of the member 75 grid assembly to its normal seat in said member at the conclusion of the said period of member separation and just prior to return of the upper iron member into closing relation with the lower, complementary member.

Since the supply or constitution of the batter delivered for cooking between the members 75 and 77 may react during the cooking operation to develop a surplus extruded from between and exteriorly of the coacting said members, it is expedient to provide means for automatically trimming any such extrusion from the waffle prior to separation thereof from the iron assembly, and such means is illustrated as including a trimmer ring 157 conformably fitted closely about and exteriorly of the iron member 75 for shift axially of said member across the meeting face plane of said member and its complementary member 77. The ring 157 may be fixed to and supported by stems 158 exteriorly overlying and slidable in guides carried by the struts 123 and automatic actuation of said ring may derive from and as a reflection of rotation of shaft 92 through the agency of a cam 159 fixed to said shaft and formed with a single, radially-projecting lobe 160, a lever 161 oscillatable about a frame-fixed fulcrum 162 in reaction to rotation of the cam lobe 160, and a hinge connection between a yoke end of the lever 161 beneath the plate 143 and an annulus 163 interlinking the lower ends of the stems 158 exteriorly of the struts 123. The cam lobe 160 is positioned angularly of the shaft 92 in such correlation with the outlines of the cams 134, 148, and 155 as to oscillate the lever 161 for reciprocation of the ring 157 across the face meeting plane of the members 75 and 77 just prior to separation of the said members at the completion of the waffle cooking period.

Supply of electric current to the heating elements 122 of the iron members 75 and 77 for cooking of the batter charge therebetween during the appropriate phase of the operating cycle and to the development of a heat intensity productive of the degree of waffle cooking desired is had through circuits, hereinafter more particularly described, under the control of selector means automatically reactive to manual impression of options upon and within the control mechanism of the apparatus and through supplementary thermostatic means reactive to the actual temperatures of the cooking iron members. Determinative of the degree or intensity of the heat to be developed at the cooking iron assembly through the elements 122, a four-position switch, rheostat, or the like, is represented at 164 as served by a suitable supply circuit and furnished with an arm 165 normally held by a spring 166 at one limit of its arcuate travel range and shiftable for selective, circuit-completing registration with one or another of four positions wherethrough the current intensity output of the unit 164 to the elements 122 is esablished. In its normal, springheld position at one limit of its travel range, the arm 165 establishes a circuit of minimum potential to the elements 122 effective through the latter to warm the cooking iron assembly and maintain the iron members ready for cooking use; in its first position of registration against the pressure of spring 166, represented by the contact point 167, the arm 165 establishes a circuit of relatively increased potential effective through the elements 122 to accomplish minimum adequate cooking of a waffle, as to a light-brown color; in its second position of registration against the pressure of spring 166, represented by the contact point 168, the arm 165 establishes a circuit of yet greater potential effective through the elements 122 to more thoroughly cook a waffle, as to a medium-brown color; and in its final position of registration against the pressure of spring 166, represented by the contact point 169, the said arm establishes a circuit of maximum potential effective through the elements 122 to cook a waffle to a dark-brown color. Shift of the arm 165 to its various circuit-establishing positions other than that to which it is normally returned by the spring 166 is selectively accomplished through the agency of a rod 170 hinged at one end to the free end of arm 165 and frame-supported for axial reciprocation in spaced parallelism with the shaft 92. The rod 170 axially traverses a spaced series of coaxial, frame-fixed electromagnets 171 of appropriately-graduated axial length, or effective throw, and slidably mounts an armature 172 for and adjacent each of said electromagnets 171 in end-engagement with a collar 173 fixed to said rod in appropriate correlation with the associated electromagnet; the electromagnets 171, armatures 172 and collars 173 being so proportioned and disposed as to reflect energization of the axially shortest unit 171 as rod 170 shifts effective to register the arm 165 with the contact point 167, energization of the next longer unit 171 as rod 170 shifts effective to register the arm 165 with the contact point 168, energization of the longest unit 171 as rod 170 shifts effective to register said arm with the contact point 169, and deenergization of all said units 171 as rod 170 return shifts deriving from the spring 166 and effective to register said arm at the limit of its travel range marked by establishment of the circuit through elements 122 of least potential. To obviate the possibility of arm 165 shifting away from a selected setting during the operative cycle of the apparatus, the circuits serving the electromagnets 171 are effective for unit energization only during a brief period at the end of one and the beginning of another apparatus cycle and the shift of rod 170 occasioned by energization of any one of the electromagnets 171 is retained after interruption of the energizing circuit and through the so-conditioned apparatus cycle by mechanical means brought into play as an incident of such rod shift. To limit and control availability of the circuits to the electromagnets 171, a lead common to all said circuits includes a normally-open switch 174 conveniently mounted on the partition 79 adjacent the shaft 92 and furnished with an actuating finger 175 reactive to a radial lobe 176 on a cam 177 fixed to and for rotation with said shaft for closing of said switch to complete the circuit therethrough; the cam 177 being so related with the shaft 92 as to close the switch 174 during that interval of shaft rotation corresponding with initiation of the apparatus operating cycle. The rod being reciprocable in spaced parallelism with the shaft 92, retention of said rod in any one of its various positions determined by energization of an electromagnet 171 after interruption of the circuit to such electromagnet is readily accomplished through the agency of an arm 178 shiftable with and projecting radially from the rod 170 toward the shaft 92 and across the marginal orbits of generally-circular plates 179 fixed in spaced, parallel relation to and for rotation with said shaft; the said plates 179 being radial of the shaft. The plates 179 are alike in a similar mounting angularly of the shaft 92 and each of said plates is formed with a marginal notch or recess defined between radial shoulders 180 and extending through approximately ninety degrees of arc in a depth radially of the associated plate 179 sufficient to shiftably accommodate and clear the arm 178, so that appropriate positioning of the plates 179 as an incident of shaft 92 rotation opens a path through which the free end of the arm 178 may move without obstruction as the rod 170 is reciprocated in reaction to the electromagnets 171. The peripheral notches of the plates 179 defined between the shoulders 180 are registered in alignment longitudinally of the shaft 92 and are so disposed angularly of the shaft as to define and maintain a clear travel path for the arm 178 during the interval of rotation of shaft 92 subsequent to completion of the waffle cooking operation and including initiation of the next apparatus operative cycle, thus to provide that the said rod 170 and arm 178 may shift freely at the initiation of a given operative cycle and during the interval of circuit completion to the electromagnets through the switch 174 and may later be free to shift in reaction to the spring 166 after the waffle cooking phase of the cycle is concluded. The plates 179 function as stops against which the free end of the arm 178 may selectively engage to limit shift of the rod 170 in reaction to the spring 166 during the waffle cooking operation and after the electromagnet circuits have been broken at the switch 174, for which purpose said plates are spaced along the shaft 92 at intervals appropriate through plate engagement with the arm 178 to hold the rod 170 in any of its various positions of adjustment as determined by the electromagnets 171 for registration of the arm 165 with the contact points of the unit 164, so that, the rod 170 having been shifted to engage the arm 165 with a particular contact point of the unit 164 while the notches of the plates 179 are disposed to accommodate travel of arm 178, subsequent rotation of the shaft 92 operates to release electromagnet control of said rod through circuit interruption at the switch 174 and immediately interposes an uninterrupted margin of a plate 179 in the return path of the arm 178 for retention of the latter and the associated rod 170 in the position of adjustment determinative of the desired energy flow to and heating effect within the cooking iron members 75 and 77.

Supplementing the election of heating circuits available through the unit 164 and related elements and automatically controlling the operation of the so-elected circuit, means reactive to the actual temperature of one of the iron member faces 121 is provided in the form of a unit indicated generally by the numeral 181. As more particularly shown in Figures 37 and 38, the unit 181 includes a suitable housing appropriately framemounted adjacent the iron member 75 for the slidable reception and accommodation of a rod 182 axially shiftable in a conventional manner in reaction to the temperature of a heat-responsive element (not shown) interiorly of the member 75 and adjacent the cooking face thereof, said rod 182 shifting for increase of its extension within the housing of unit 181 in reaction to increase of temperature at the iron member cooking face and retracting relative to said unit housing in reaction to decrease of temperature at the iron member cooking face, all of which is known and conventional practice and operation typical of available thermostatic devices. A contact arm 183 is hinged within the housing of the unit 181 to sweep across a plurality of contact plates supported within said housing in appropriate connection with the leads of various circuits, and one end of said arm 183 is operatively engaged with the end of the rod 182 so that axial shift of the latter is reflected as arcuate travel of the arm 183. The contact plates engaged by the arm 183 are susceptible of various arrangements to accomplish the desired heat-responsive automatic functions, the particular arrangement shown and hereinafter described being but representative of other structural organizations operable to the same end. As shown in Figure 38, a relatively short, arcuate contact plate 184 is disposed to underlie and cooperate with the end of the arm 183 remote from its hinge point when said arm is positioned by the rod 182 in reaction to minimum temperature condition of the iron member cooking face, thereby completing a circuit to a signal light consequently energized to indicate a cold, or inoperative, condition of the iron members, and said plate 184 is of an arcuate extent adequate to maintain the circuit to the signal light until the temperature at the member cooking face is elevated to a stand-by operative condition, at which minimum operating temperature shift of the rod 182 operates to move the arm 183 out of contact with the plate 184 and to consequent interruption of the circuit serving the signal light. Correlated with the plate 184, a similar arcuate contact plate 185 in controlling relation with a circuit determinative of apparatus cyclic operation, as through control of the position of clutch element 94 relative to the complementary element 96, is disposed in the sweep path of the arm 183 for circuit-completing engagement with said arm as the latter interrupts its contact with the plate 184 and in an extension from said initial point of arm engagement to the limit of travel of arm 183 in reaction to temperature elevation, thereby conditioning the apparatus for cyclic operation when the iron member cooking face has attained its minimum stand-by temperature and maintaining such operative conditioning of the apparatus throughout the higher temperature ranges of the cooking iron members. A third arcuate contact plate 186 is provided in the unit 181 for operative engagement with the arm 183 and is arranged to complete the circuit to the cooking iron heating elements 122 as established by the arm 165 of the unit 164 in its position of minimum potential as determined by free arm reaction to the spring 166, said plate 186 completing its associated circuit when the arm 183 is at that limit of its travel reflecting a cold cooking face condition and maintaining such circuit completion through said arm to the point of arm shift reflecting the minimum desired stand-by temperature of the cooking face. Similar to the contact plate 186, additional contact plates 187, 188 and 189, of graduated lengths, are included in and for separate control of the circuits to the heating elements 122 leading from and respectively represented by the contact points of unit 164 of graduated potential 167, 168 and 169; the contact plates 187, 188 and 189 extending for engagement with the arm 183 from the position of the latter representing a cold cooking face condition to respective terminations at the positions of arm 183 reflecting the successive cooking temperatures appropriate for production of light, medium, or dark, cooked waffles. As will be apparent, the arrangement typically illustrated and hereinabove described provides means for automatically indicating when the iron members are too cold for cooking purposes and for inhibiting cyclic operation of the apparatus during such cold condition; provides means for automatically establishing and maintaining a minimum stand-by temperature conditioning the iron members for operation; and provides means for automatically determining and maintaining a desired degree of cooking heat in the iron members in reaction, as will hereinafter appear, to option indications selectively impressed through the apparatus controls, said latter means functioning for maintenance of the desired elected temperature with regard to either or both limits of the temperature ranges, since energy for heating purposes may not flow through a circuit of lower temperature value when the iron cooking face is above the elected temperature and until the temperature has been sufficiently lowered to permit circuit completing engagement of the arm 183 with the appropriate contact plate.

Cooked waffle transfer and delivery

At the end of the cooking phase of the apparatus operative cycle, the iron members 75 and 77 are automatically separated and the cooked waffle is automatically elevated and held in a plane above that of the lower iron member by means of the bars 138, all as hereinabove described. Transfer of the cooked waffle from its position of elevation between the cooking iron members is accomplished through the agency of a forked assembly shiftable in correlation with other phases of the operative cycle longitudinally of the apparatus on rails 190 frame fixed in spaced parallelism transversely of the table 76 to define a plane parallel to and above said table. The rails 190 are appropriately worked to guide and rollably engage wheels 191 carried by and in an arrangement appropriate to mount a rigid box frame 192 bridging between and arranged for translation along said rails, and spaced fingers 193 similarly project from upper and lower elements of the frame 192 toward the cooking iron members 75 and 77 in an arrangement and spacing paralleling the rails 190 suitable to engage between the elevated bars 138 of the member 75 and to extend across the area of said member when the frame 192 is at the limit of its travel range more nearly adjacent said member. As is clearly shown in Figures 31, 32, and 33, the fingers 193 are fixed to and extend in coplanar relation laterally from upper and lower elements of the frame 192 to define a shallow trough or slideway open at each of its ends, translatable along the rails 190, and of a size to receive and accommodate a waffle between the iron members, the lower elements of the frame 192 and the associated fingers 193 being disposed to reciprocate in a plane immediately above that of the cooking face of iron member 75 for engagement of the lower bank of fingers 193 beneath and against the underface of a cooked waffle in elevated position on the bars 138 for consequent transfer of said waffle from said bars and to said lower bank of fingers when the frame 192 is moved to the limit of its travel range toward the cooking member; leading ends of the lower bank fingers 193 being appropriately beveled or tapered to accomplish such transfer of the waffle as an incident of frame and finger reciprocation. Thus, the iron members 75 and 77 being separated, the cooked waffle being elevated on the bars 138 above the member 75, and the frame 192 being shifted on its rails 190 toward and for extension of its fingers across said member 75, the cooked waffle is transferred to and supported by the lower bank of fingers 193 in position for travel with the frame 192 away from the cooking iron members.

Actuation of the frame 192 along its rails 190 in correlation with other cyclic phases of the apparatus operation is accomplished through the agency of suitable cams fixed to and for rotation with the shaft 92 and a linkage between said cams and frame. As shown, a rock-shaft 194 is journaled for oscillation about its axis transversely of the table 76 adjacent the table upper surface to extend in perpendicular relation with and beneath the shaft 92 and rails 190 at approximately the midpoint of said rails, and telescopic arm assemblies 195 rise in spaced parallelism from fixed connection of their corresponding ends with the shaft 194 to hinged engagement of their other ends with axes fixedly outstanding from the frame 192 across the upper surface of rail 190, so that oscillation of the shaft 194 in its journal mounting operates to correspondingly swing the arm assemblies 195 through parallel vertical arcs and to consequently shift the frame 192 and finger assembly along the rails 190, the arm assemblies 195 extending and contracting in length as said frame and finger assembly is shifted toward and away from the respective limits of its travel range. Adjacent its end underlying the shaft 92, the rock-shaft 194 is furnished with a fixedly-related block or cross-arm 196 extending perpendicularly and symmetrically on either side of said shaft and hence aligning longitudinally with the axis of the shaft 92. Stems 197 are guided for vertical reciprocation through frame-fixed members in bearing engagement of their lower ends against the outer end upper faces of the element 196, and the upper ends of said stems 197 are furnished with followers engaging the peripheries of opposed, complementary cams 198 fixed in spaced parallel relation to and for rotation with the shaft 92. As will be apparent, cam-applied pressure against the engaged end of one of the stems 197 is transmitted through said stem to depress the corresponding end of the element 196 and thereby rock the shaft 194 when the stem 197 engaging the other end of said element 196 is permitted to rise relative to its cam 198, and the peripheries of cam 198 are hence contoured and arranged in complementary opposition to simultaneously depress one and permit corresponding elevation of the other of the stems 197 in a sequence and alternation effective to rock the shaft 194 for shift of the frame 192 and finger assembly from an intermediate position on the rails 190 to that limit of its travel effective for transfer of the cooked waffle to said assembly, to then shift said assembly to the opposite limit of its travel range and into appropriate registration with a plate stack, as will hereinafter appear, and to then return said assembly to its position of rest at the intermediate point of its travel range, said cams 198 having substantially the contour shown in Figures 43 and 44 and being so fixed in angular relation with the shaft 92 as to maintain the transfer assembly in its position of rest and out of engagement with the cooking iron members during a major portion of rotation of shaft 92 and to actuate said transfer assembly for extraction of the cooked waffle from the cooking iron members during that interval when said members are automatically separated as a phase of shaft 92 rotation reflected through the cams and linkages previously set forth.

At the limit of its travel range remote from the cooking iron members 75 and 77, the transfer assembly constituted from the frame 192 and fingers 193 is adapted to register with and spaced above a stack of serving plates 199 supported and maintained for use as hereinafter set forth, so that, the transfer assembly being charged with a cooked waffle removed from the iron members and said waffle being held against movement with the transfer assembly as the latter is returned out of registration with the plate stack, said waffle is projected through the open side of the frame 192 remote from the cooking iron members as the transfer assembly clears the plate stack in a direction of travel toward said members and is hence delivered to and disposed upon the uppermost plate 199 of said stack when the transfer assembly reaches its normal position of rest. Effective to project the cooked waffle from the transfer assembly as the latter moves away from outer travel limit registration with the plate stack, a comb-like element 200 is mounted below and for altitudinal reciprocation in guided relation with a frame yoke 201 bridging transversely of the apparatus assembly above and in perpendicular relation with the rails 190; said element 200 being disposed to closely overhang the transfer assembly frame 192 when said assembly is in its rest position and being formed with spacedly-parallel, depending teeth arranged to engage at times through the spaces between the parallel fingers 193 of the transfer assembly. The element 200 is hinged to one end of a lever 202 pivoted to and for oscillation in a vertical arc beneath the yoke 201 and is normally held by said lever in clearing relation above the transfer assembly through the pressure of an expansive coil spring 203 operatively engaged between the yoke 201 and the end of the lever 202 remote from the element 200. The end of the lever engaged by the spring 203 overhangs the shaft 92 and is reactive to a cam 204 fixed to and for rotation with said shaft through the agency of a stem 205 reciprocably frame guided in end bearing engagement between said lever end and the periphery of the cam 204. The cam 204 is contoured to provide an appropriate radially-projecting lobe 206 operable as an incident of rotation of shaft 92 to elevate the stem 205, rock the lever 202 against the pressure of the spring 203, and consequently lower the element 200 to intersection of the element teeth with and through the planes of the transfer assembly fingers 193; the disposition of said lobe 206 angularly of the shaft 92 being so correlated with the contoured margins of the cams 198 as to lower the element 200 for engagement of its teeth across the travel path of the transfer assembly when the latter has been moved by the cams 198 to the limit of its travel range remote from the cooking iron members, to maintain said element 200 in such lowered relation during return travel of the transfer assembly from its outermost limiting position and to its position of rest, thereby effecting ejection of the cooked waffle from the transfer assembly, and to elevate said element 200 into full clearing relation with the transfer assembly as soon as the latter has returned to its rest position; such correlation of cyclic phases being operable to slide the cooked waffle out of the transfer assembly for gravity deposit on the uppermost plate 199 of the stack.

The stack of serving plates 199 is carried on a conveniently circular platform 207 altitudinally reciprocable beneath the rails 190 in registration with the outer limiting position of transfer assembly travel and hence largely at that side of the yoke 201 remote from the cooking iron members. The platform 207 engages by means of suitable apertured bosses 208 with and to slide axially on a plurality of like threaded stems 209 rotatably upstanding from the table 76 in spaced parallelism to intersect marginal zones of said platform exteriorly of the margins of plate 199, and end-toothed detents 210 slidably engage through the bosses 208 in an appropriate simultaneously-operable arrangement to operatively latch said bosses to the threads of the associated stems 209 when the detents 210 are at the limit of their radial extension inwardly of their respective bosses and to free said bosses for slidable travel on the associated stems 209 when said detents are at an outward limit of their shift radially of the bosses; latching engagement or disengagement of the detents relative to the threaded stems being an automatic function of means and apparatus hereinafter described.

It is a function of the threaded stems 209 to progressively and automatically elevate the platform 207 in appropriate synchronism with the cyclic operation of the apparatus and to thereby maintain an uppermost plate element 199 in appropriate position to receive a cooked waffle from the transfer assembly and in desired relationship with a serving shelf to which the plate may be automatically shifted after receiving its waffle charge. The stems 209 being alike as to thread pitch and inclination, simultaneous rotation of said stems in latched engagement with their respective detents 210 will operate to uniformly lift or lower the platform 207 in accordance with the direction of rotation of stem 209, and means are provided for automatically and repetitiously rotating said stems in a direction effective to elevate the platform as the successive plate elements 199 are charged and removed from the stack. Like pinions 211 are fixed in coplanar relation to the lower ends of the stems 209 and mesh with the toothed periphery of a sun gear 212 pivoted for rotation in simultaneous driving engagement with all said pinions 211 about a pivot fixed to the table 76 beneath the platform 207, so that rotation of the gear 212 is operable to simultaneously and uniformly rotate the pinions 211 and the stems 209 carrying said pinions. Since it is desired to elevate the platform 207 in a succession of steps correlated with the operative cycle of the apparatus and effective to present and maintain a plate element 199 in position to receive the successive cooked waffle charges from the transfer assembly, it is feasible and expedient to apply rotation of the shaft 92 to effect such gear rotation as well as to correlate and synchronize the other operative phases of the organization. As shown, a slide arm 213 is frame-mounted for reciprocation on the table 76 in the plane of the gear 212 and transversely of said table between said gear and the overhang of the shaft 92, the end of the arm 213 adjacent the gear 212 carrying a sping-loaded ratchet detent 214 operable upon shift of said arm toward said gear to engage and rotate the latter, and the end of the arm 213 remote from said gear hingedly engaging with the lower end of a lever 215 upstanding through a frame-fixed fulcrum to terminate in a follower adjacent the shaft 92. A spring 216 operatively engages between the lower end of the lever 215 and a frame-fixed member, such as one of the slide bearings for the arm 213, and operates to hold said arm with its detent 214 engaging the teeth of the gear 212 and the upper end of said lever approached toward the shaft 92 with its follower held against the periphery of a cam 217 fixed to and for rotation with said shaft, so that a lobe 218 projecting radially from the margin of cam 217 in appropriate angular correlation with the operating elements of the cams 198 and 204 may function to rock the lever 215 on its fulcrum, retract the arm 213 away from the gear 212 with consequent ratcheting of the detent 214 over the gear teeth, and finally release said lever for return to its initial position in reaction to the spring 216 effective through the arm 213 to accomplish rotation of pinion 211 and gear 212. As will be manifest, the rotative feed of the gear 212 deriving from oscillation of the lever 215 through the agency of the cam lobe 218 is proportioned to accomplish elevation of platform 207 through a distance corresponding to the interval of one plate element 199 in the stack and in such correlation with transfer assembly travel and element 200 actuation as to reestablish the upper level of successive plate elements 199 after each removal of a waffle-charged plate from the stack.

Rotation of the gear 212 intermittently deriving from rotation of the shaft 92, as above described, is effective through engagement of the detents 210 with the threads of the stems 209 to elevate the platform 207 through successive altitudinal steps correlated with the plate sack to maintain a plate element 199 in position to receive the waffle charge from the transfer assembly, but since the gear 212 is arranged to be driven in only that direction productive of platform 207 elevation, return of said platform to its lowermost position ready for plate stack recharge after depletion of a previous plate charge is accomplished through disengagement of the detents 210 from the threads of stem 209 and consequent gravity descent of the platform along said stems. To facilitate simultaneous and automatic shift of the detents 210 radially of their respective bosses 208 in reaction to conditions of plate stack supply, each of the detents 210 is hinged to the upper end of a link 219 hinged at its other end to and upstanding for oscillation in a vertical arc exteriorly along the corresponding boss 208, and an appropriate connection 220 engages between corresponding upper ends of the links 219 to unite the latter for corresponding, simultaneous oscillation relative to their associated bosses 208. Retention of the detents 210 in either of their two positions of adjustment radially of their mounting bosses is facilitated by the provision of a spring-pressed ball plunger 221 for latching coaction with appropriate notches formed in a margin of each of said detents, the plunger 221 and marginal notches of each detent 210 being manifestly so arranged as to yieldably position and retain the detent in operative end engagement with the associated stem threads at the inner limit of the radial shift of each detent relative to its mounting boss 208 and to alternatively position and yieldably retain said detent in end clearing relationship with the stem threads when the detent is shifted radially and outwardly of its mounting boss. Automatic retraction of the detents 210 from end engagement with the stem 209 threads and consequent gravity-lowering of the platform 207 along said stems is conveniently accomplished by suitably beveling the upper end of one of the links 219, as indicated at 222, and providing a similarly beveled stop 223 on and in depending relation from a fixed element of the apparatus in position to be engaged by the beveled end 222 when the platform 207 approaches that upper limiting position characterized by removal of the last plate element 199 therefrom, continued uprise of the platform 207 with the beveled end 222 engaging the stop 223 operating to oscillate the so-engaged link 219 for retraction of its detent 210 out of threaded engagement with its stem 209 and to simultaneously and correspondingly retract the other detents 210 through the agency of the connection 220 for complete release of the platform 207 relative to the stems 209 such as permits the platform to drop on said stems to its lowermost position adjacent the gear 212. Similarly, the lower end of the link 219 carrying the bevel 222 may be appropriately beveled, as at 224, for coaction with a frame-fixed beveled stop 225 in a manner to effect oscillation of said link 219 for reengagement of the detents 210 with the stem 209 threads when the platform 207 is at the lower limit of its altitudinal travel range, thereby automatically conditioning said platform for intermittent elevation in the manner previously described.

A final automatic operation characteristic of the apparatus is the shifting of the uppermost, waffle-charged, plate element carried by the platform 207 from the stack and to a frame-fixed serving shelf 226 conveniently projecting exteriorly of the apparatus at an appropriate elevation relative to other features and instrumentalities of the organization. The shelf 226 is mounted with its upper surface horizontal and at a level slightly below the top plane of the uppermost plate element 199 successively positioned through intermittent elevation of the platform 207, so that said upper plate element may be pushed laterally away from its position on the plate stack and to the shelf 226 by means of pressure applied to the plate rim remote from said shelf, and an arcuately-margined pusher 227 is arranged to conformably engage with the plate margin remote from the shelf and to reciprocate on tracks 228 slightly below and spacedly paralleling the tracks 190 at a level appropriate to clear the pusher 227 beneath the transfer assembly 192—193 and the next to the uppermost of the plate elements 199 in the stack; a construction and interrelation of pusher 227 and tracks 228 operable to permit the pusher to ride over the margin of the shelf 226 adjacent the plate stack being operatively desirable. Actuation of the pusher 227 for transfer of a waffle-charged plate element 199 from the stack and to the shelf 226 is an automatic function deriving from rotation of shaft 92 in appropriate correlation with transfer assembly travel and other phases of the apparatus cycle, and is accomplished through the agency of a rock-shaft 229 spacedly paralleling the similar shaft 194 and telescopic arm assemblies 230, similar to the assemblies 195, fixedly and radially upstanding from said shaft 229 to connection of their extensible outer portions with opposite sides of the pusher 227 adjacent the tracks 228. Thus, oscillation of the shaft 229 about its axis operates through the arm assemblies 230 as the latter swing through vertical arcs along the tracks 228 to shift the pusher 227 transversely across the plate stack position. Automatic oscillation of the shaft 229 about its axis in synchronism with the other operative phases of the apparatus controlled by the shaft 92 is effected through the agency of a block or cross-arm 231 in fixed relation on an end of the shaft 229 below the shaft 92 and frame-guided stems 232 reciprocable in spaced parallelism and in end bearing engagement between the outer ends of the block 231 and the peripheries of spaced cams 233 and 234 fixed to and for rotation with the shaft 92. As will be manifest, depression of one of the stems 232 operates through the block 231 to rock the shaft 229 in one direction while depression of the other such stem serves to rock said shaft in the opposite direction, and the margins of cams 233 and 234 are hence appropriately contoured to maintain said shaft 229 in a position determinative of pusher 227 clearing relation with the plate stack during a larger arc of shaft 92 rotation and to permit, as by means of a complementary radial recess and lobe, oscillation of said shaft for travel of pusher 227 completely across the plate stack position and return into clearing relation with the plate stack in the interval of shaft 92 rotation immediately subsequent to return of transfer assembly to its intermediate inoperative position after delivery of a cooked waffle to the uppermost element 199 of the plate stack; such actuation of pusher 227 occurring just after the cam 217 has functioned to elevate the platform 207 and plate stack thereon and concluding the operative cycle of the apparatus through transfer of the waffle-charged plate from the stack and to the serving shelf 226.

*Selective control and indexing means*

Constituted as shown and hereinabove described, each apparatus unit including an iron member assembly is adapted for automatic, cyclic operation culminating in the delivery of a cooked waffle for each complete revolution of the shaft 92 and susceptible through the means and in the manner hereinafter set forth of regulation as to the degree to which a given waffle order is cooked and the number of similarly or variously cooked waffle orders to be successively and automatically produced.

While but a single apparatus unit effective for the operation of only one iron member assembly has been shown and described, it is to be understood that multiple such units may be assembled as a battery in driven relation with a single motor 97 through the shaft 99 and for indexing as to the selective options through a single control station; the typical such station illustrated and hereinafter particularized being adapted for, and susceptible of arrangement by means of appropriate wiring to accomplish, control of the optional factors pertinent to operation of four apparatus units in a common battery. The elements of the control station effective for regulation of the multiple units being structural and functional duplicates, only those elements of the illustrated station pertinent to selective control of the primary unit shown in the drawings will be described.

In and adjacent the upper end of a suitable frame 235 fixedly upstanding from the table 76 near the end of the shaft 92 remote from the motor 97, a shaft 236 is journaled for rotation about its axis in perpendicular relation with, to one side of, and somewhat below the shaft 92. Spacedly paralleling and beneath the shaft 236, a similar shaft 237 is rotatably mounted in the frame 235 and an endless ladder assembly comprised from end chain loops 238 and spacedly-parallel, like channel bars 239 bridging transversely therebetween is operatively sprocket-mounted upon and for travel about and between said shafts 236 and 237 within the frame 235; the operative length of said ladder and the consequent number of bars 239 therein being initially determined with relation to the desired capacity to receive successive advance waffle orders, as will hereinafter appear.

Each bar 239 carries the full complement of elements requisite for optional control of one complete apparatus unit cycle as represented by one revolution of the shaft 92, and the ladder assembly including said bars is hence arranged for step-by-step advance synchronized with and deriving from rotation of shaft 92 in a manner to uniformly and successively elevate the bars on the assembly side remote from the motor 97 one interval of the ladder sequence for each revolution of the shaft 92. Various drives operable to intermittently advance the ladder assembly in synchronism with rotation of shaft 92 may be effectively utilized, a typical arrangement for such purpose being illustrated as comprising a ratchet wheel 240 fixed to the end of the shaft 236 adjacent the shaft 92 and exteriorly of the frame 235 and cooperating with a spring stop 241 carried by said frame to inhibit ratchet wheel and shaft rotation save in that direction effective to elevate the ladder assembly reach remote from the motor 97, an operating lever 242 furnished with a spring-loaded detent 243 for customary coaction with the ratchet wheel teeth and end-journaled on the shaft 236 for oscillation across the end face of the wheel 240, a retractile spring 244 engaging between the free end of said lever and a point on the frame 235 to normally hold the lever at a position of maximum elevation with its detent 243 engaging one of the ratchet wheel teeth, and a finger 245 on the lever 242 free end disposed in the rotational path of a lug or boss 246 outstanding from and adjacent the margin of one face of a disc 247 fixed to and for rotation with the shaft 92. With the arrangement shown and described, each revolution of the shaft 92 effects an engagement of the lug 246 against the lever finger 245 which operates to depress the lever's free end against the tension of the spring 244 and to consequently rotate the ratchet wheel 240 and shaft 236 one space through the agency of the detent 243 carried by the lever, the shape of the lug 246 and the proportions of the associated elements being so designed as to advance the ladder assembly the appropriate distance for each duration of interengagement of lug 246 and finger 245 and the spring 244 acting to elevate and reposition the lever 242 with its detent engaging the next successive ratchet wheel tooth when the lug 246 has cleared the lever's end finger. Manifestly, the lug 246 is positioned angularly of its disc 247 to effect advance of the ladder assembly near the completion of one apparatus unit cycle, thereby to elevate a trailing bar 239 into the control position synchronously vacated by the bar which has regulated the cycle just completed.

The bar 239 positioned for control of an apparatus unit cycle is registered with a bridge 248 fixedly traversing the frame 235 within the ladder assembly orbit parallel to and slightly below the shaft 236 in close adjacency with the inner face of the ascending ladder assembly reach, and, it being the function of the bar to determine and establish the degree to which the waffle to be produced under its control is to be cooked, said bridge spacedly mounts like, separate switches 249 through which the circuits to the respective solenoids 171 are separately led for completion or interruption. Three switches 249, one for each of the solenoids 171, are adequate for the selective control of each apparatus unit operation, and, in the arrangement shown, said switches are normally open to interrupt the circuits controlled thereby and are similarly furnished with a mechanical or electrical contact 250 engaging through the bridge 248 and terminating closely adjacent the inner face of the bar 239 registered with said bridge in position for coaction with elements carried by said bar and selectively positionable to close the associated switch as an incident of such coaction. The elements carried by the bar 239 for selective coaction with the contacts 250 are alike on each such bar in sequence aligned longitudinally of the ladder assembly and are identical in structure, function and operation, each of said elements being shown as a straight, rigid arm 251, conveniently square in cross section and of a thickness receivable between the outwardly-directed flanges of the associated channel bar, and each of said arms 251 is end-entered between the flanges of its bar 239 and pinned to outstand perpendicularly therefrom and for limited oscillation in the plane of the bar length by pivot pin 252 engaging through the channel flanges and arm end; the mounting of arm 251 on the associated bar being accomplished with a snug fit of the pivoted end of the arm between the flanges of the bar to provide frictional resistance to oscillation of the arm 251 about the pivot pin 252. The free end of each arm 251 is skew-beveled to a plane inclining outwardly and downwardly of the ladder assembly and also laterally and inwardly of said assembly, and the inner end corner of each arm on the longer side margin thereof is furnished with a longitudinal projection 253 registered with and to traverse a hole formed for its accommodation in the base of the mounting bar 239 and eccentric to the pivot pin 252 in a manner operable to retract the projection 253 relative to the inner face of the bar base and away from the bridge 248 when the arm 251 is perpendicular to its bar 239 and to extend said projection through and beyond the bar base inner face and toward the bridge when the arm is shifted on the pivot pin 252 in the direction of the arm's longer side margin and to the position shown by broken lines in Figure 56. As is clearly illustrated, the arms 251 of each bar 239 are thereon mounted to dispose their projections 253 in travel paths intersecting the contacts 250 coactable therewith, thus to provide that when a given bar 239 is registered with the bridge 248 in operative control position, the projections 253 of the arms 251 carried by said bar are registered with the contacts 250 of the bridge, the projections of the arms perpendicular to said bar are non-operatively spaced from their respective contacts, and the projection of any arm shifted on its mounting toward its longer side margin is operatively engaged with its contact 250 for consequent closing of the associated switch 249 and completion of the circuit to a solenoid controlled by said switch; operative impression of the desired option indication requiring only appropriate lateral displacement of the pertinent arm 251 relative to its bar mounting.

A triggering assembly operable to translate manual impression of selected options into appropriate lateral adjustment of the arms 251 on a bar in control position registration with the bridge 248 or on the bars trailing said positioned bar, or on both, includes a beam 254 spacedly paralleling the shaft 236 in outwardly spaced relation with the ascending reach of the ladder assembly and the arms 251 carried thereby and end-engaged with and to slide altitudinally upon spacedly-parallel, vertical posts 255 fixed between upper and lower elements of the frame 235 in substantially the planes of the ladder assembly chain end loops and sprockets. The beam 254 pivotally mounts a series of like fingers 256 each yieldably spring-held in and spring-returnable to perpendicular relation with said beam in an extension at each end beyond the beam, one such finger 256 being provided for and in end-spaced alignment with each arm 251 of a bar 239, and the end of each finger 256 opposed to the end of an arm 251 is skew-beveled to a plane paralleling that of the arm's beveled end and spaced therefrom a distance to permit the ends of aligned arm and finger elements to clear and freely pass when the one is moved altitudinally relative to the other. The skew-beveling of the arm and finger opposed ends to parallel planes disposes the finger's longer side margin in normal alignment with the arm's shorter side margin, so that oscillation of a finger 256 about its pivot and in the direction of its shorter side margin causes an overlap of the finger point relative to the aligned arm's beveled end, as indicated by broken lines in Figure 56, in a manner productive of lateral displacement of the free end of the arm when the so oscillated finger 256 is moved downwardly relative to the corresponding arm and into sliding coaction of the arm and finger end bevels. A swing plate 257 is pivoted at its ends to frame member 235 in side face engagement with the shorter side margin of each finger 256 extending beyond the beam 254 and away from the ladder assembly and to oscillate about a vertical axis adjacent the plate's inner margin, the beam and each finger thereon being hence slidable along and in maintained relation with the associated plate 257 in a disposition permitting appropriate oscillation of the plate to accomplish corresponding oscillation of the associated finger in any altitudinal position of the latter and applying the spring loading of the finger to normally maintain the plate in perpendicular relation with the beam. Plungers 258 slidably intersect a control panel 259 in altitudinally-staggered relation adjacent the upper ends of plates 257 in a number and appropriate designation indicating the "light," "medium" and "dark" cooking options obtainable through the selective control means, said plungers being preferably spring-loaded for yieldable maintenance at a normal maximum extension outwardly of the panel 259, and the inner end of each said plunger individually and separately mounts a detent bar 260 shiftable with the associated plunger toward and away from adjacent margins of the swing plates 257; said bars 260 similarly carrying wedge-shaped detents 261 in engagement at their inclined margin points with outer margins of the swing plates 257 and in an arrangement effective to apply the plunger designation to oscillation of the appropriate plate or plates 257, fingers 256, and ultimately the arms 251, when a given plunger is pressed inwardly for reaction of its associated detents 261 against the engaged plates. The beam 254 being normally at the upper limit of its altitudinal reciprocatory range and hence above the bridge 248 and bar 239 registered therewith at the initiation of apparatus unit operation, as will hereinafter appear, actuation of a given plunger 258 for registration of an option election swings the appropriate plate 257 and finger 256 out of their perpendicular relation with the beam, so that all that is required to impress the election for automatic reflection through apparatus operation is such downward travel of the beam as will suffice to engage the displaced end of finger 256 with, slidably against, and for consequent lateral adjustment of the pertinently aligned arm or arms 251 on the bar or bars 239 past which said beam is moved; the number of successive bars 239 past which the beam 254 is lowered with one of its fingers 256 triggered for shift of the arms 251 encountered in its downward travel path determining the number of similarly cocked waffles to be sequentially produced through successive operative cycles of the apparatus. Thus, it being desired to obtain three waffles cooked to a "light" degree, the plunger 258 designated "light" is pressed and the beam 254 is simultaneously lowered past three of the bars 239 of the ladder assembly, the pressing of the selected plunger operating through its associated detent bar 260 and the detent 261 thereon to swing the appropriate plate 257 about its axis for corresponding deflection of the finger 256 bearing against said plate and the lowering of the beam carrying said deflected finger functioning as above described to oscillate the arms 251 encountered by said finger on three successive bars 239 into position for engagement of their projections 253 with the contact 250 controlling the circuit to the solenoid 171 determinative of a "light" cooking condition at the iron assembly when and as said bars are elevated as an incident of ladder assembly translation into registration with the bridge 248, such engagement of the arm projections with the said contact serving to close the circuit controlled by the latter as each bar 239 carrying an oscillated arm 251 successively registers with the bridge 248. Release of the pressed plunger 258 after desired lowering of the beam 254 permits the spring of finger 256 to return said finger and the associated plate 257 to normal positions perpendicular to the beam 254, leaving the oscillated arms 251 potentialed for circuit-completing cooperation with the contact 250.

Lowering of the beam 254 past and for reaction on the arms 251 of a desired number of bars 239 is accomplished through the agency of a bank of like keys 262 independently mounted to intersect and to slide vertically relative to the panel 259 in a side-by-side arrangement and lateral spacing for disposition of their ends extending inwardly beyond said panel in overhanging relation with the upper margin of a lever 263 pivoted at one end to the inner face of said panel at one side of the ladder assembly to swing in a vertical arc adjacent and paralleling said panel's inner face with the lever's free end opposite the midpoint of beam 254 when said lever is substantially horizontal, as in Figure 52; the number of independent keys 262 being proportioned to the capacity of the particular control unit construction. By virtue of the mounting of keys 262 and arrangement shown and described, like depression of the respective keys in inner end bearing engagement with the upper margin of lever 263 is reflected as oscillation of the free end of the lever unlike distances, the key 262 most remote from the lever pivot moving the lever's free end the shortest distance for a given vertical key travel and the key closest to the lever pivot moving the lever's free end the greatest distance for a like vertical travel of the key. Applying the factor just noted to practical effect, the keys 262 are mounted with graduated travel paths relative to the panel 259 so proportioned in length as to reflect full permissible travel of the key 262 most remote from the pivot of lever 263 as depression of the free end of the lever through a distance corresponding to one interval of ladder assembly travel, to reflect full permissible travel of the next adjacent, or second, key 262 as depression of the free end of the lever through a distance corresponding with two intervals of ladder assembly travel, and similarly throughout the key bank to the end that the numerical position of any key counting outwardly in the bank from the key most remote from the lever pivot corresponds with the number of ladder assembly travel intervals, or apparatus cycle sequences, through which the lever's free end is moved in response to full travel depression of said key.

The free end of the lever 263 engages, in a manner hereinafter elaborated, with and to vertically shift a block 264 slide-mounted upon and for reciprocation along spacedly-parallel guides 265 fixed inwardly adjacent and to parallel the panel 259 in a vertical disposition, and expansive springs 266 which telescoped about said guides bear against the under side of said block to urge the latter and the lever's free end therewith engaged to an upper limit of their travel range corresponding with the upper travel limit of the keys 262 as elevated and aligned as an incident of upward swing of lever 263.

It being desired to depress the beam 254 in reaction to downward oscillation of the free end of lever 263 the number of ladder assembly intervals represented by the travel range of the actuated key 262, to leave said beam in its depressed position for return to the upper limit of its travel range by means of and in synchronism with ladder assembly travel as will hereinafter appear, and to return the block 264 and free end of lever 263 to the upper limit of their common travel range in reaction to pressure of springs 266 for full and appropriate reflection of subsequent depressions of key 262 after each such depression of a key, the said block 264 engages with and operates to shift the beam 254 through a ratcheting, rather than a direct connection, arrangement. Conditioning the beam 254 for response to oscillations of the free end of lever 263 and consequent travel of block 264, a yoke 267 is rigidly engaged with the ends of said beam to lie in the plane of the beam and in loosely embracing relation about the swing plates 257 between said plates and the block 264, and a ratchet-toothed rack 268 fixedly and vertically upstands from the midlength of said yoke with its toothed margin opposed to and closely adjacent, but spaced slightly from, the center of the inner face of block 264. A cylindrical stud 269 fixedly outstanding from the lever 263 and perpendicular to the plane of lever oscillation loosely and slidably engages within a vertically-elongated recess formed for its accommodation within the adjacent face of the block 264 and is provided with a fixedly-related stem 270 slidably received in a bore opening upwardly and vertically of the block from the stud-accommodating recess, whereby to guide said stud in its reciprocation relative to its recess and to inhibit shift of the stud axially away from the block 264. The inner end of the stud 269 is beveled downwardly and outwardly of the block 264 toward the lever 263 and slidably engages with a correspondingly-beveled side of a detent block 271 recess-mounted in the block 264 to slide toward and away from the lever 263 and provided with an integral, horizontally-disposed finger 272 projectible at times through an opening in the inner face of block 264 into latching engagement with the ratchet teeth of the rack 268, an expansive coil spring 273 acting between the detent block 271 and a wall of the recess 264 to normally urge the detent block toward the lever 263 and to retract its finger 272 out of engagement with the teeth of rack 268. With the arrangement shown and described, pressure applied through any one of the keys 262 to swing the lever 263 downwardly from its normal position of maximum free end elevation initially operates to move the stud 269 downwardly in its recess 264 and to consequently shift the detent block 271 away from the lever and to project its finger 272 into latching engagement with one of the teeth of rack 268, the spring 273 being weaker than the springs 266, whereafter further downward oscillation of the free end of lever 263 depresses the block 264 on its guides and simultaneously and correspondingly depresses the beam 254 latched to the block 264 through the agency of the yoke 267, rack 268, and finger 272. When the pressure depressing the lever 263 is released, the springs 266 return the lever's free end and the block 264 to the upper limit of their common travel range, the latching finger 272 retracting within the block 264 as the lever 263 is permitted to elevate slightly relative to said block or ratcheting over the teeth of the rack 268 to a new position of latching potential relative thereto. As appears from the foregoing, the beam 254 remains at that position of depression relative to the ladder assembly to which it has been moved, wherein it indicates by the number of ladder intervals it has traversed the number of apparatus unit cycles to be sequentially accomplished, and from which it is elevated by and synchronously with the automatically intermittent ladder assembly travel for return to its upper travel limiting position above the bar 239 operatively registered with the bridge 248, the means for retaining the said beam in its adjusted relation with the ladder assembly and for return elevation of said beam being shown as comprising relatively-stiff spring fingers 274 fixedly and horizontally outstanding from ends of the beam perpendicular to the beam length across the travel paths of pins 275 outwardly and horizontally projected in a fixed, uniform spacing corresponding with that of the ladder assembly intervals from the end chain loops 238 of the ladder assembly, the said spring fingers 274 being constituted to yield at their tips and ratchet over the pins 275 as the beam 254 is depressed, to transmit elevation of pins 275 incident to ladder assembly travel for corresponding elevation of the beam, and to ratchet relative to said pins when the beam is stopped and held at the upper limit of its travel range by shoulders or abutments in fixed relation with the posts 255. Thus, in any and every adjusted relation of the elements comprising the control and indexing means, the plungers 258 and keys 262 are conditioned to receive and transmit appropriate option indications and the beam 254 is conditioned to receive and properly reflect such transmittals in every position of its altitudinal adjustment within the capacity of the unit. Displacement of the arms 251 out of normal perpendicular relation with their respective bars 239 having accomplished the desired reactions after said arms and bars pass upwardly beyond the position of registration with the bridge 248, it is expedient that the arms be returned to perpendicular relation with their bars and hence conditioned for subsequent resetting as they traverse the uprise reach of the ladder assembly, for which purposes realigning means, such as appropriately-inclined webs 276, may be fixed in any convenient location relative to the travel orbits of arms 251 and arranged to shift back to perpendicular relation with its bar any and all of the arms displaced from such relation, all as an automatic incident of ladder assembly travel.

Since location of the beam 254 and its related elements at the upper limit of its travel range is indicative of an inoperative condition of the apparatus and the lack of any election impression, either as to number of waffle orders or degree of waffle cooking, charged into the control means, and location of said beam in any depressed relation with said upper limit of its travel range is indicative of an operative apparatus condition to be continued through sequential cycles until the beam returns to its travel range upper limit, such limit may be utilized through the agency of a suitable switch 277 to control the circuit to the motor 97. Thus, conditioning of the apparatus for operation through elections transmitted by the beam 254 and its elements automatically energizes the motor and sets the operations in train, while completion of all orders charged into the control unit is reflected by elevation of the beam into circuit-breaking engagement with the switch controlling motor actuation. Alternative to the foregoing, and as illustrated, the switch 277 may control a circuit to a solenoid 278 operatively associated with and to rock one end of a lever 279 yoked at its other end in engagement with and to shift the clutch member 94 splined to the shaft 92 in such manner as to engage the said member 94 with its complementary driving member 96 when the solenoid 278 is energized by closing of the switch 277, thereby completing drive to the shaft 92, and to permit spring-induced separation of said clutch members when the solenoid 278 is deenergized by opening of the switch 277, and such rocking of the lever 279 may be applied through a normally spring-closed switch 280 in the motor circuit to open the latter switch and consequently interrupt motor operation when the lever is swung to disengage the clutch members and to permit closing of the switch 280 for completion of the circuit to the motor when said lever reacts to energization of the solenoid 278 with drive-completing clutch member interengagement; the switch 277 functioning thus indirectly to control operation of the motor synchronously with direct control of the clutch drive. Assuring an angular disposition of the shaft 92 effective for initiation of the apparatus operating cycle whenever said shaft comes to rest, a peripheral notch 281 intersecting the non-clutching face of the member 94 is positioned for the reception of a fixed stop finger 282 in a relation determinative of the desired rest position of shaft 92, and said finger in bearing engagement with the unnotched margin of the clutch member face prevents declutching of the shaft 92 drive and interruption of the motor circuit save when the notch 281 attains registration with the finger.

*Control and signal circuits*

In Figure 60 is conventionally represented one simple and feasible system of circuits and electrical connections operable to give full effect to the cyclically automatic, correlated operations of the apparatus hereinabove described. A circuit for the supply of electric current is represented by the usual two leads 283 and 284 in one, or both, of which is provided a manually-operable master switch 285, conveniently mounted on the panel 259, employable to power the apparatus for operation or to electrically isolate the apparatus elements from the power supply. A circuit 286 connects the motor 97 through the switch 280 in parallel with the leads 283 and 284, so that when the normally-open switch 280 is closed by oscillation of the lever 279 current flow through the circuit 286 will energize and operate said motor to set in train the mechanical sequences of the apparatus cycle.

It being requisite for satisfactory performance of the apparatus cycle that the iron members 75 and 77 shall have attained a suitable low temperature, or "stand-by" heat, that there be a plate or plates 199 on the platform 207, and that appropriate elections shall have been indexed into the control means through lowering of the beam 254, the various switch means reactive to attainment of said essential conditions are connected in series in a circuit serving the solenoid 278, so that the latter can not be energized to oscillate the lever 279, start the motor 97, and clutch the drive from said motor to the shaft 92 until the recited essential conditions are all satisfied. As shown, a branch 287 from the lead 284 connects with and through the solenoid 278, thence through the switch 277 and through a switch 288 reactive to platform 207 position, as hereinafter more particularly described, to connection with the contact plate 185 of the thermostatic unit 181, while a branch 289 from the lead 283 connects with the contact arm 183 of the unit 181 to complete a circuit to the solenoid 278 when said arm makes contact with its plate 184 in response to appropriate "stand-by" heat of the iron members 75 and 77 and the switches 277 and 288 are in circuit-closing position. As above set forth, the switch 277 is spring-closed to complete the circuit therethrough whenever the beam 254, and its yoke 267, is lowered in reaction to the indexing of elections into the control means and is opened only when said beam and its yoke is elevated to an upper liimting position indicative of no options charged into the apparatus so that the charging of options into the apparatus serves to close said switch for completion of its portion of the circuit serving the solenoid 278 and completion of the last order charged into the apparatus serves to open said switch for inhibition of apparatus operation, regardless of the position of the other switches included in the same circuit. The switch 288 is positioned adjacent the upper limit of platform 207 travel and is adapted to be shifted to interrupt the branch lead 287 through the solenoid 278 and to complete a circuit to a branch 290 connecting through a signal lamp 291 with the lead 284 when the said platform attains a position corresponding with exhaustion of its plate stack 199, tripping of the detent 210 by the stop 223 being feasibly applied to shift the switch 288 from closing relation with the circuit serving the solenoid and to closing relation with the circuit through the lamp 291. Since the switch 288 should continue to interrupt the circuit to the solenoid 278 and to energize the lamp 291 until the plate supply has been replenished, it is arranged for manual shift to closing relation with the solenoid circuit and consequent interruption of the circuit of lamp 291, such manual shift being accomplished by the attendant who resupplies the plate stack. Thus, lack of plates on the platform 207, a cold condition of the iron members, and a lack of options cahrged into the control means, will, in each and all instances, interrupt the solenoid circuit and inhibit apparatus operation, while an adequate "stand-by" heat at the iron members and a supply of plates on the platform 207 condition the solenoid circuit for completion, with consequent apparatus operation, whenever the beam 254 is lowered in reaction to the indexing of elections. The contact plate 184 of the unit 181, indicative of a "cold" iron condition when engaged by the arm 183, is connected by a branch 292 through a signal lamp 293 and lead 294 with the supply lead 284, so that a "cold" iron condition establishes a circuit through the lamp 293 to energize the latter for visual indication of the deficiency.

Exhaustion of batter from the reservoir 78 being a condition requiring attendant attention and warranting visual indication, said hopper may be equipped with a switch 295 in a circuit 296 connecting through a signal lamp 297 between the branch leads 289 and 294, said switch 295 being operable to close the circuit therethrough and energize the lamp 297 when the pressure of batter content within the reservoir approaches a minimum, and to open said circuit at batter pressures above minimum.

The branch 294 from the lead 284 connects with and through the heating elements of the iron members 75 and 77 and to the arm 165 of the unit 164 for selective, iron-heating circuit completion through the contact points 167, 168 and 169 of said unit 164, the contact plates 186, 187, 188 and 189 of the unit 181, and the arm 183 of the latter unit served by the branch 289 from the lead 283. The corresponding contact points of the unit 164 and contact plates of the unit 181 being directly connected by appropriate conductors, it follows that current will flow through one or another of the so-established circuits and to the heating elements of the iron members whenever the master switch 285 is closed, the particular circuit serving the heating elements being determined by shift of the arm 165 through the agency of one or another of the solenoids 171 in correlation with the control means indexing, as previously described. A branch 298 from the lead 294 serves all of the solenoids 171 in parallel through the switch 174, so that only when said switch is closed by the cam 177 can any one of said solenoids be energized, and the circuit-completing leads from said solenoids connect through their respective switches 249 and contacts 250 carried by the bridge 248 for coaction with the displaceable arms 251 of the ladder assembly which are in turn connected with the supply lead 283 by a branch 299, so that, when a given arm 251 of the ladder assembly is displaced and rises to contact with its correspondingly aligned element 250, a circuit is completed through and to energize the associated solenoid 171 during the interval the switch 174 is closed, such energizing of a given solenoid 171 operating to shift the arm 165 from its contact point of minimum iron member heat and to that one of its higher heat contact points appropriate for the throw of the acting solenoid, all as above set forth.

Since the drive from the motor 97 to the shaft 92 may be declutched only at the termination of a complete apparatus cycle as evidenced by a full revolution of shaft 92 and determined by registration of the clutch member notch 281 with the stop finger 282, the switch 280 may not open to interrupt the circuit powering the motor until the operative cycle is finished, regardless of interruptions in the circuit to the solenoid 278, whenever and however occasioned.

Since many changes, variations, and modifications in the form, construction, and arrangement of the elements shown and described may be had without departing from the spirit of my invention, I wish to be understood as being limited solely by the scope of the appended claims rather than by any details of the illustrative showing and foregoing description.

I claim as my invention:

1. In an automatic waffle iron, the combination of a separable cooking iron assembly adapted to be supplied with batter from a batter supply means, a platform adapted to support a stack of serving plates mounted for altitudinal reciprocation in spaced relation with said cooking iron assembly at the side thereof remote from the batter supply means, transfer means horizontally shiftable between the cooking iron assembly and a position of registration above said platform, a pusher horizontally reciprocable across the upward projection of the platform position between said platform and the travel path of said transfer means, gear means rotatable to altiudinally adjust said platform, whereby to dispose the uppermost element of a plate stack carried by the platform in the plane of pusher reciprocation, a single shaft mounted for slow rotation about its axis at one side of and to span between said batter supply means and platform, a plurality of cams on and rotatable with said shaft, followers reactive to rotation of said cams, and linkages between appropriate such followers and the cooking iron assembly, transfer means, pusher, and gear means, whereby to apply a single rotation of said shaft to effect correlated actuation of the so-linked means and pusher and cooking iron assembly for the production and delivery of a cooked waffle.

2. The organization according to claim 1, wherein the cooking iron assembly consists of a fixed lower member and an upper member altitudinally movable into and out of closing relation with said lower member, the cam on said shaft and operatively linked with said assembly being formed with angularly-spaced lobes effective to elevate said upper member away from the lower member during correspondingly spaced leading and trailing phases of shaft rotation in each cycle of operation.

3. The organization according to claim 1, wherein the cooking iron assembly consists of altitudinally-separable upper and lower members, the cam on said shaft and operatively linked with said assembly being formed with angularly-spaced lobes effective to separate said members during correspondingly spaced leading and trailing phases of shaft rotation in each cycle of operation, the transfer means includes a carrier reciprocable across the upper face of the assembly lower member, the cam on said shaft and operatively linked with said transfer means being formed with a lobe effective to shift said carrier across the face of the lower member of said assembly once during each revolution of the shaft, and the lobes of said cams being correlated angularly of the shaft to so shift said carrier when the cooking iron assembly members are separated during the trailing phase of shaft rotation in each cycle of operation.

4. The organization according to claim 1, wherein the cooking iron assembly consists of altitudinally-separable upper and lower members, a waffle-releasing grid is associated with each of said members for shift toward and away from the mating face thereof, the cam on said shaft and operatively linked with said assembly being formed with angularly-spaced lobes effective to separate said members during correspondingly spaced leading and trailing phases of shaft rotation in each cycle of operation, a pair of the linkages reactive to cam rotation engaging said grids, and the cams engaging the followers on said grid-operating linkages comprising a single-lobe cam for the actuation of each such linkage and provided on the shaft in a lobe correlation angularly of the shaft with the member-separating cams effective to shift the grids toward the mating faces of their mounting members when the latter are separated during the trailing phase of shaft rotation in each cycle of operation.

5. The organization according to claim 1, wherein the transfer means includes a carrier shiftable into and out of registration above said platform, the cam on said shaft and operatively linked with said transfer means being formed with a lobe effective to so shift the carrier once during each revolution of the shaft, said transfer means also including a comb-like element being mounted for altitudinal reciprocation into and out of obstructing relation across said carrier when the latter is registered with and above the platform, one of the linkages reactive to cam rotation engaging said comb-like element for reciprocation thereof, and one of said cams comprising a single-lobe cam for the actuation of such linkage provided on the shaft in a lobe correlation angularly of the shaft with the carrier-shifting cam effective to lower said element into obstructing relation across the carrier when the latter is fully registered with and above the platform.

6. The organization according to claim 1, wherein the transfer means includes a carrier shiftable into and out of registration above said platform, the cam on said shaft and operatively linked with said transfer means being formed with a lobe effective to so shift the carrier once during each revolution of the shaft, one of the linkages reactive to cam rotation engaging the pusher for reciprocation thereof, and one of said cams comprising a single-lobe cam for the actuation of such linkage provided on the shaft in a lobe correlation angularly of the shaft with the carrier-shifting cam effective to project the pusher across the platform position when the carrier is fully retracted out of registration with and above the platform.

7. The organization according to claim 1, wherein said cams include a single-lobe cam on the shaft actuating the pusher linkage to project the pusher in one direction across the platform position and a second single-lobe cam on the shaft actuating the pusher linkage to return the pusher across the platform position, the gear means is arranged for intermittent rotation through the agency of a detent linkage, and a single-lobe cam for the actuation of the detent linkage is provided on the shaft in a lobe correlation angularly of the shaft with the pusher-actuating cams effective to rotate the gear means when the pusher has been fully returned from its projected relation with the platform position.

8. In an automatic waffle iron, a separable cooking iron assembly, and an altitudinally-reciprocable platform for the support of a stack of serving plates aligned in a spaced succession, transfer means mounted for reciprocation between the cooking iron assembly and a position of registration above said platform, a pusher mounted for reciprocation across the platform position between the platform and the travel path of said transfer means, gear means rotatable to altitudinally adjust said platform, a single shaft mounted for slow rotation about its axis in spaced, parallel, spanning relation with said aligned succession of cooking iron assembly and platform, linkages including followers reactive to the rotation of cams on said shaft individually engaging with and for the operation of said cooking iron assembly, transfer means, pusher, and gear means, and lobed cams fixed to said shaft in actuating relation with the linkage followers; said cams being assembled to said shaft in a correlation of their lobes angularly of the shaft effective to correlate and sequentially relate the operations thereby controlled in a cycle accomplished through one revolution of said shaft.

References Cited in the file of this patent

UNITED STATES PATENTS

| | | |
|---|---|---|
| 1,749,414 | Christianson | Mar. 4, 1930 |
| 1,904,198 | Brand | Apr. 18, 1933 |
| 1,961,141 | Fausel | June 5, 1934 |
| 2,238,698 | Knaust | Apr. 5, 1941 |